United States Patent
Fukata et al.

(10) Patent No.: US 9,239,960 B2
(45) Date of Patent: Jan. 19, 2016

(54) THREE-DIMENSIONAL OBJECT DETECTION DEVICE

(71) Applicant: Nissan Motor Co., Ltd., Yokohama-shi, Kanagawa (JP)

(72) Inventors: Osamu Fukata, Sagamihara (JP); Yasuhisa Hayakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 63 days.

(21) Appl. No.: 14/373,064

(22) PCT Filed: Feb. 26, 2013

(86) PCT No.: PCT/JP2013/054860
§ 371 (c)(1),
(2) Date: Jul. 18, 2014

(87) PCT Pub. No.: WO2013/129358
PCT Pub. Date: Sep. 6, 2013

(65) Prior Publication Data
US 2015/0016681 A1     Jan. 15, 2015

(30) Foreign Application Priority Data

Mar. 2, 2012  (JP) ................................ 2012-046629

(51) Int. Cl.
*G06K 9/00* (2006.01)
*G08G 1/16* (2006.01)
*B60R 1/00* (2006.01)
*G06T 7/20* (2006.01)

(52) U.S. Cl.
CPC .............. *G06K 9/00805* (2013.01); *B60R 1/00* (2013.01); *G06T 7/206* (2013.01); *G08G 1/165* (2013.01); *G08G 1/166* (2013.01); *G08G 1/167* (2013.01); *B60R 2300/607* (2013.01); *B60R 2300/802* (2013.01); *G06T 2207/10004* (2013.01); *G06T 2207/20048* (2013.01); *G06T 2207/20064* (2013.01); *G06T 2207/30261* (2013.01)

(58) Field of Classification Search
CPC ...... G06K 9/00805; B60R 1/00; G06T 7/206; G08G 1/165; G08G 1/166; G08G 1/167
See application file for complete search history.

(56) References Cited

U.S. PATENT DOCUMENTS

| | | | |
|---|---|---|---|
| 6,636,257 B1* | 10/2003 | Harada | G01S 11/12 348/113 |
| 8,744,680 B2* | 6/2014 | Rieger | B60W 40/11 235/385 |

(Continued)

FOREIGN PATENT DOCUMENTS

| | | |
|---|---|---|
| JP | 5-143737 A | 6/1993 |
| JP | 2006-107313 A | 4/2006 |

(Continued)

*Primary Examiner* — Shefali Goradia
(74) *Attorney, Agent, or Firm* — Global IP Counselors, LLP

(57) ABSTRACT

A three-dimensional object detection device includes an image capturing unit, an image conversion unit, a three-dimensional object detection unit, a movement speed calculation unit, a three-dimensional object assessment unit, a non-detection-object assessment unit and a control unit. The image conversion unit converts a viewpoint of the images to create bird's-eye view images. The three-dimensional object detection unit detects a presence of a three-dimensional object within the predetermined detection area based on difference waveform information. The movement speed calculation unit calculates a movement speed of the three-dimensional object. The non-detection-object assessment unit detect san amount of variability in the movement speed of the three-dimensional object, and assesses whether the three-dimensional object is a non-detection object based on the amount of variability. The control unit inhibits the three-dimensional object assessment unit from assessing that the three-dimensional object is the another vehicle based on the assessment results.

15 Claims, 21 Drawing Sheets

(56) References Cited

U.S. PATENT DOCUMENTS

2002/0169537 A1* 11/2002 Regensburger ....... G01S 13/931 701/96
2004/0068350 A1* 4/2004 Tomson ................. G01C 21/36 701/1

FOREIGN PATENT DOCUMENTS

| | | |
|---|---|---|
| JP | 2007-316790 A | 12/2007 |
| JP | 2008-219063 A | 9/2008 |
| JP | 2008-227646 A | 9/2008 |
| JP | 2012-3662 A | 1/2012 |

* cited by examiner

|  | BRIGHTNESS IS AT A PREDETERMINED VALUE OR HIGHER (DAYTIME) | BRIGHTNESS IS LESS THAN PREDETERMINED VALUE (NIGHTTIME) |
|---|---|---|
| $|\Delta V| \geqq 30$km/h | X1 INCREASE | X2 INCREASE |
| 30km/h $> |\Delta V| \geqq 10$km/h | Y1 DECREASE | Y2 DECREASE |
| 10km/h $> |\Delta V|$ | Z1 DECREASE | Z2 DECREASE |

FIG. 11

THREE-DIMENSIONAL OBJECT DETECTION DEVICE

CROSS-REFERENCE TO RELATED APPLICATIONS

This application is a U.S. National stage application of International Application No. PCT/JP2013/054860, filed Feb. 26, 2013, which claims priority to Japanese Patent Application No. 2012-046670 filed in Japan on Mar. 2, 2012. The entire disclosure of Japanese Patent Application No. 2012-046670 is hereby incorporated herein by reference.

BACKGROUND

1. Field of the Invention

The present invention relates to a three-dimensional object detection device.

2. Background Information

In a conventional technique, captured images captured by an image capturing device are subjected to image processing using pattern matching to thereby detect roadside plantings (see Japanese Laid-Open Patent Application No. 2008-227646).

SUMMARY

However, the conventional technique detects shrubbery by image processing carried out by pattern matching. Therefore, high detection accuracy cannot be obtained in detecting plant growths, and there may be cases in which a plant growth in a captured image is errantly detected as another vehicle traveling in an adjacent lane.

The problem to be solved by the present invention is to provide a three-dimensional object detection device capable of suitably detecting an adjacent vehicle.

The present invention solves the problem by detecting a three-dimensional object based on a captured image, calculating the amount of variability in the movement speed of the three-dimensional object based on the amount of change in time of the movement speed of the detected three-dimensional object, and assessing whether the detected three-dimensional object is an object that is not to be detected based on the calculated amount of variability.

Generally, edge components and other image information in an image in which a plant growth has been captured are irregularly detected. Therefore, the movement speed of a three-dimensional object tends to be variable when the amount of change in time of the movement speed of the three-dimensional object is calculated based on the image information. In accordance with the present invention, it is assessed whether a detected three-dimensional object is a plant growth or another object that is not to be detected, based on the amount of variability in the movement speed of the three-dimensional object, whereby an adjacent vehicle can be suitably detected.

BRIEF DESCRIPTION OF THE DRAWINGS

Referring now to the attached drawings which form a part of this original disclosure.

FIG. 11 is a view for describing increasing and decreasing the count value.

DETAILED DESCRIPTION OF THE EMBODIMENTS

Figure 1:
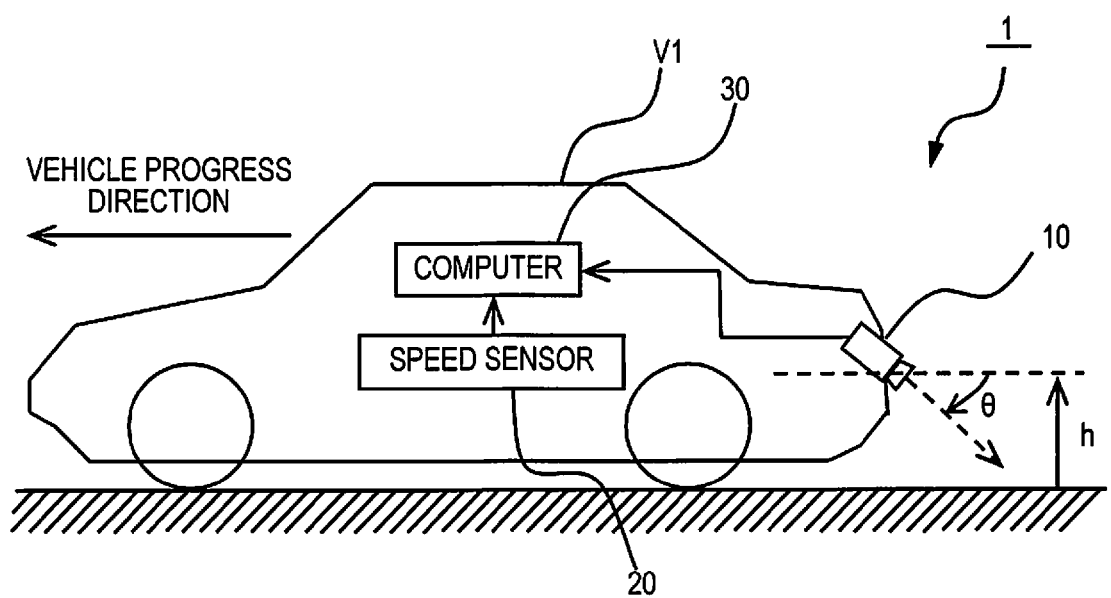
FIG. 1 is a schematic structural diagram of a vehicle in which a three-dimensional object detection device has been mounted.

FIG. 1 is a schematic overview of a vehicle in which a three-dimensional object detection device 1 according to the present embodiment has been mounted. An object of the three-dimensional object detection device 1 according to the present embodiment is to detect another vehicle (may hereinbelow be referred to as "adjacent vehicle V2") present in an adjacent lane where contact is possible should a host vehicle V1 change lanes. The three-dimensional object detection device 1 according to the present embodiment is provided with a camera 10, a speed sensor 20, and a computer 30, as illustrated in FIG. 1.

The camera 10 is attached to the host vehicle V1 so that the optical axis is an angle θ downward from the horizontal in a location at a height h at the rear of the host vehicle V1, as illustrated in FIG. 1. From this position, the camera 10 captures a predetermined area of the surrounding environment of the host vehicle V1. The speed sensor 20 detects the travel speed of the host vehicle V1 and calculates the vehicle speed from a wheel speed detected by, e.g., a wheel speed sensor for detecting the rotational speed of a wheel. The computer 30 detects an adjacent vehicle present in an adjacent lane rearward of the host vehicle.

Figure 2:
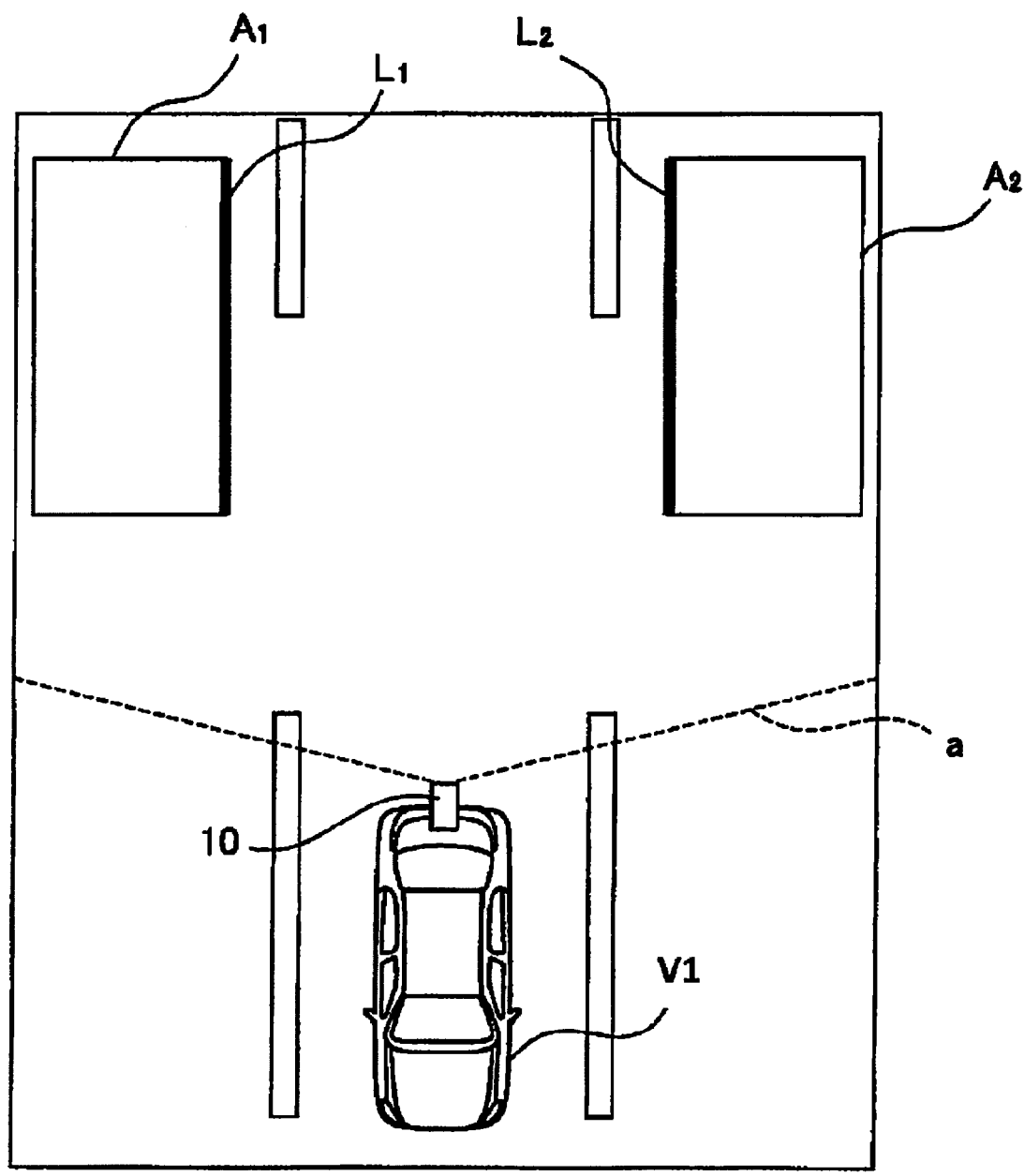
FIG. 2 is a plan view illustrating the traveling state of the vehicle in FIG. 1.

FIG. 2 is a plan view illustrating the traveling state of the host vehicle V1 in FIG. 1. As illustrated in the drawing, the camera 10 captures the rearward side of the vehicle at a predetermined view angle a. At this time, the view angle a of the camera 10 is set to a view angle that allows the left and right lanes (adjacent lanes) to be captured in addition to the lane in which the host vehicle V1 is traveling.

Figure 3:
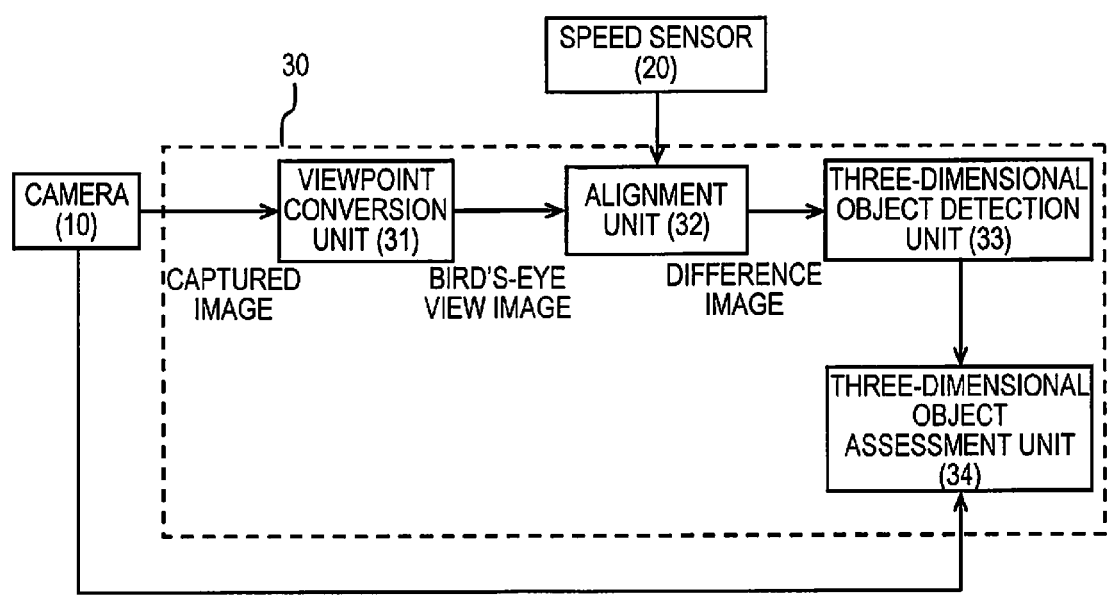
FIG. 3 is a block diagram illustrating the details of the computer.

FIG. 3 is a block view illustrating the details of the computer 30 in FIG. 1. The camera 10 and the speed sensor 20 are also illustrated in FIG. 3 in order to distinctly indicate connection relationships.

As illustrated in FIG. 3, the computer 30 is provided with a viewpoint conversion unit 31, an alignment unit 32, a three-dimensional object detection unit 33, and a three-dimensional object assessment unit 34. The configuration of these units is described below.

Captured image data of the predetermined area obtained by capturing carried out by the camera 10 is inputted to the viewpoint conversion unit 31, and the captured image data thus inputted is converted to bird's-eye view image data, which is a bird's-eye view state. A bird's-eye view state is a state of viewing from a viewpoint of an imaginary camera that is looking down from above, e.g., vertically downward. Viewpoint conversion can be carried out in the manner described in, e.g., Japanese Laid-Open Patent Application No. 2008-219063. The reason that captured image data is converted to bird's-eye view image data is based on the principle that perpendicular edges unique to a three-dimensional object are converted to a straight-line group that passes through a specific fixed point by viewpoint conversion to bird's-eye view image data, and utilizing this principle allows a planar object and a three-dimensional object to be differentiated.

Figure 4:
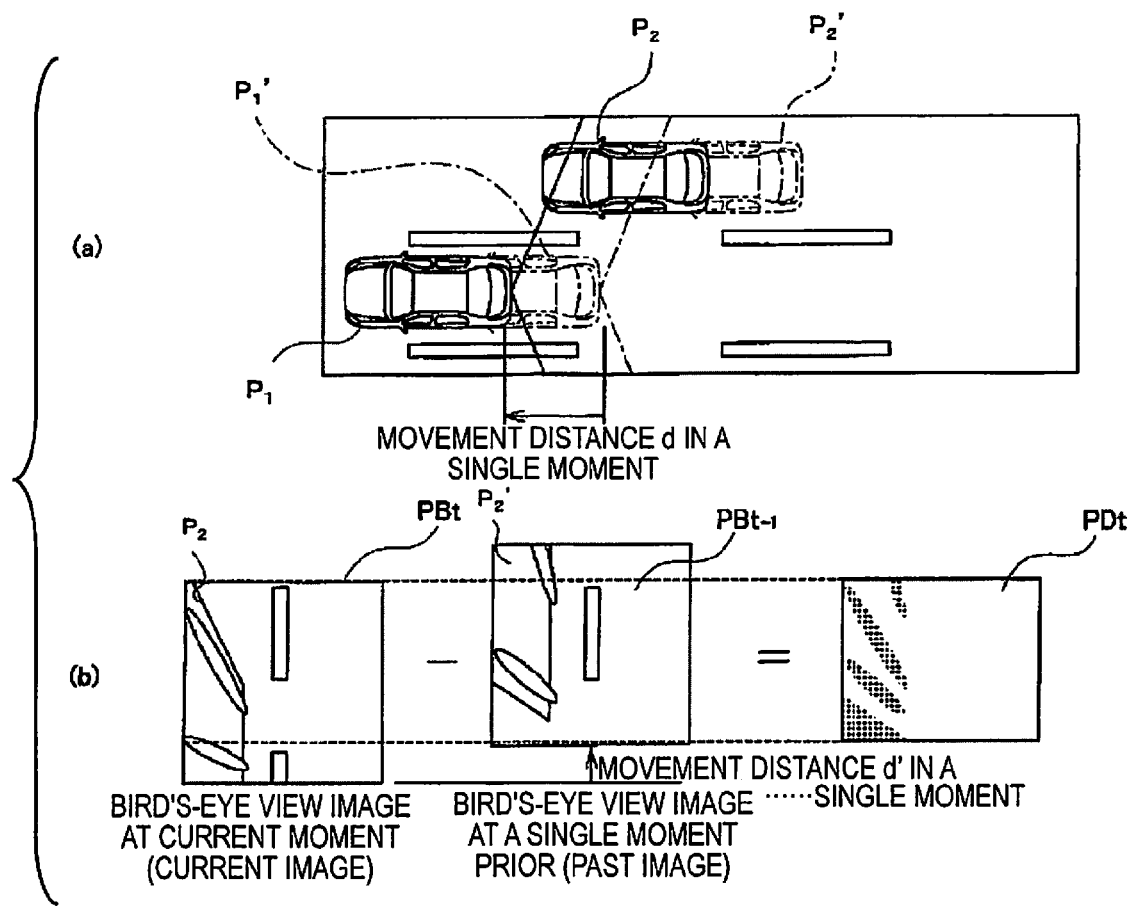
FIG. 4 is a view describing the general overview of the processing of the alignment unit, with part (a) illustrating the movement state of the vehicle from a top plan view, and part (b) illustrating a general overview of alignment.

The bird's-eye view image data obtained by viewpoint conversion carried out by the viewpoint conversion unit 31 is sequentially inputted to the alignment unit 32, and the inputted positions of the bird's-eye view image data at different times are aligned. FIG. 4 is a view for describing the general overview of the processing of the alignment unit 32, with part (a) of FIG. 4 being a plan view illustrating the movement state of the host vehicle V1, and part (b) of FIG. 4 being an image illustrating a general overview of alignment.

As illustrated in part (a) of FIG. 4, the host vehicle V1 at the current moment is positioned at $P_1$, and the host vehicle V1 at a single moment prior is positioned at $P_1'$. It is assumed that an adjacent vehicle V2 is positioned in the rear-side direction of the host vehicle V1 and is travelling parallel to the host vehicle V1, and that the adjacent vehicle V2 at the current moment is positioned at $P_2$, and the adjacent vehicle V2 at a single moment prior is positioned at $P_2'$. Also, it is assumed that the host vehicle V1 has moved a distance d in a single moment. The phrase "at a single moment prior" may be a moment in the past by a time set in advance (e.g., a single control cycle) from the current moment, or may be a moment in the past by an arbitrary time.

In such a state, a bird's-eye view image $PB_t$ at the current moment is illustrated in part (b) of FIG. 4. The white lines drawn on the road surface are rectangular in this bird's-eye view image $PB_t$ and are relatively accurate in a planar view, but the adjacent vehicle V2 (position $P_2$) is collapsed. The same applies to the bird's-eye view image $PB_{t-1}$ at a single moment prior; the white lines drawn on the road surface are rectangular and are relatively accurate in a planar view, but the adjacent vehicle V2 (position $P_2'$) is collapsed. As previously described, perpendicular edges of a three-dimensional object (edges that stand erect in three-dimensional space from the road surface are also included in a strict meaning of perpendicular edge) appear as a straight-line group along a collapsing direction due to the process for converting the viewpoint to bird's-eye view image data, but because a planar image on the road surface does not include perpendicular edges, such collapsing does not occur even when the viewpoint has been converted.

The alignment unit 32 aligns the bird's-eye view images $PB_t$ and $PB_{t-1}$, such as those described above, in terms of data. When this is carried out, the alignment unit 32 offsets the bird's-eye view image $PB_{t-1}$ at a single moment prior, and matches the position with the bird's-eye view image $PB_t$ at the current moment. The left-side image and the center image in part (b) of FIG. 4 illustrate the offset state by a movement distance d'. The offset amount d' is the amount of movement in the bird's-eye view image data that corresponds to the actual movement distance d of the host vehicle V1 illustrated in part (a) of FIG. 4, and is decided based on a signal from the speed sensor 20 and the time from a single moment prior to the current moment.

After alignment, the alignment unit 32 obtains the difference between the bird's-eye view images $PB_t$ and $PB_{t-1}$, and generates difference image $PD_t$ data. In the present embodiment, the alignment unit 32 takes the absolute value of the difference in the pixel values of the bird's-eye view images $PB_t$ and $PB_{t-1}$ in order correspond to variation in the illumination environment, and when the absolute value is equal to or greater than a predetermined threshold value th, the pixel values of the difference image $PD_t$ are set to "1," and when the absolute value is less than a predetermined threshold value th, the pixel values of the difference image $PD_t$ are set to "0," which allows difference image $PD_t$ data such as that illustrated on the right side of part (b) of FIG. 4 to be generated.

Returning to FIG. 3, the three-dimensional object detection unit 33 detects a three-dimensional object based on the difference image $PD_t$ data illustrated in part (b) of FIG. 4. In this case, the three-dimensional object detection unit 33 calculates the movement distance of the three-dimensional object in actual space. The three-dimensional object detection unit 33 first generates a difference waveform $DW_t$ when the three-dimensional object is to be detected and the movement distance is to be calculated.

In generating the difference waveform, the three-dimensional object detection unit 33 sets a detection area in the difference image $PD_t$. An object of the three-dimensional object detection device 1 of the present example is to calculate the movement distance for the adjacent vehicle with which there is a possibility of contact should the host vehicle V1 change lanes. Accordingly, in the present example, rectangular detection areas A1, A2 are set behind the host vehicle V1, as illustrated in FIG. 2. Such detection areas A1, A2 may be set from a relative position to the host vehicle V1, or may be set based on the position of the white lines. When set based on the position of the white lines, the three-dimensional object detection device 1 may use, e.g., known white line recognition techniques.

The three-dimensional object detection unit 33 recognizes as ground lines L1, L2 the borders of the detection areas A1, A2 thus set, on the host vehicle V1 side (side along the traveling direction), as illustrated in FIG. 2. Generally, a ground line refers to a line in which a three-dimensional object is in contact with the ground, but in the present embodiment, a ground line is not a line in contact with the ground, but is rather set in the manner described above. Even in such a case, the difference between the ground line according to the present embodiment and the normal ground line determined from the position of the adjacent vehicle V2 is not exceedingly great as determined by experience, and there is no problem in actuality.

Figure 5:
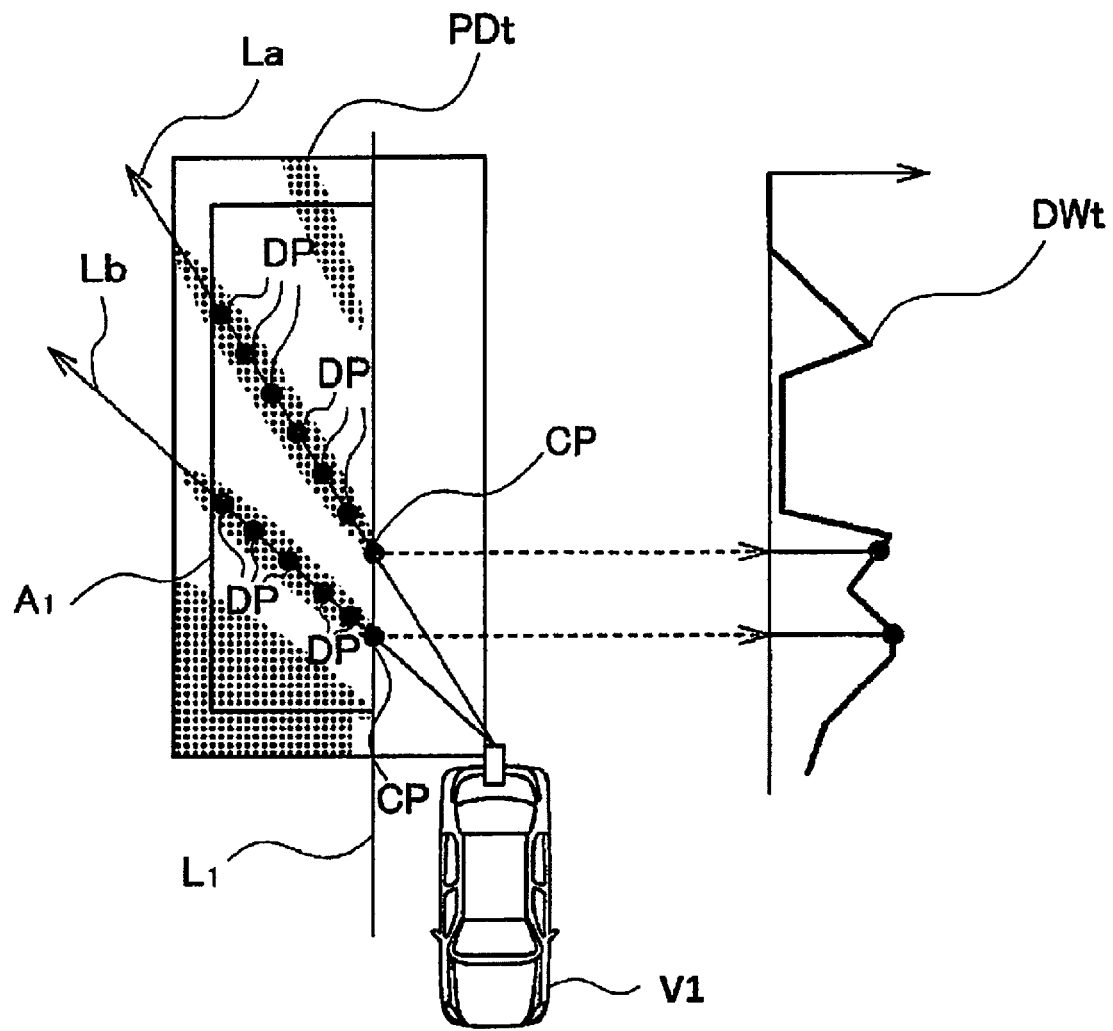
FIG. 5 is a schematic view illustrating the manner in which the difference waveform is generated by the three-dimensional object detection unit.

FIG. 5 is a schematic view illustrating the manner in which the difference waveform is generated by the three-dimensional object detection unit 33. As illustrated in FIG. 5, the three-dimensional object detection unit 33 generates a difference waveform $DW_t$ from the portion that corresponds to the detection areas A1, A2 in the difference image $PD_t$ (drawing on the right in part (b) of FIG. 4) calculated by the alignment unit 32. In this case, the three-dimensional object detection unit 33 generates a difference waveform $DW_t$ along the collapsing direction of the three-dimensional object by viewpoint conversion. In the example illustrated in FIG. 5, only the detection area A1 will be described for the sake of convenience, but the difference waveform $DW_t$ is generated for the detection area A2 as well using the same procedure.

More specifically, first, the three-dimensional object detection unit 33 defines a line La in the direction in which the three-dimensional object collapses in the difference image $PD_t$ data. The three-dimensional object detection unit 33 then counts the number of difference pixels DP indicating a predetermined difference on the line La. In the present embodiment, the difference pixels DP indicating a predetermined difference have pixel values in the difference image $PD_t$ that are represented by "0" and "1," and the pixels indicated by "1" are counted as difference pixels DP.

The three-dimensional object detection unit 33 counts the number of difference pixels DP, and thereafter determines the crossing point CP of the line La and the ground line L1. The three-dimensional object detection unit 33 then correlates the crossing point CP and the count number, decides horizontal-axis position, i.e., the position on the axis in the vertical direction in the drawing on the right in FIG. 5, based on the position of the crossing point CP, decides the vertical-axis position, i.e., the position on the axis in the lateral direction in the drawing on the right in FIG. 5, from the count number, and plots the positions as the count number at the crossing point CP.

Similarly, the three-dimensional object detection unit 33 defines the lines Lb, Lc, . . . in the direction in which the three-dimensional object collapses, counts the number of difference pixels DP, decides the horizontal-axis position based on the position of each crossing point CP, decides the vertical-axis position from the count number (the number of difference pixels DP), and plots the positions. The three-dimensional object detection unit 33 repeats the above in sequence to form a frequency distribution and thereby generate a difference waveform $DW_t$ as illustrated in the drawing on the right in FIG. 5.

Here, the difference pixels DP in the difference image $PD_t$ data are pixels which have changed in the image at different moments, in other words, locations that can be construed to be where a three-dimensional object was present. Accordingly, in locations where a three-dimensional object was present, the number of pixels is counted along the direction in which the three-dimensional object collapses to form a frequency distribution and thereby generate a difference waveform $DW_t$. In particular, the number of pixels is counted along the direction in which the three-dimensional object collapses, and a difference waveform $DW_t$ is therefore generated from information about the height direction in relation to the three-dimensional object.

The lines La and Lb in the direction in which the three-dimensional object collapses have different distances that overlap the detection area A1, as illustrated in the drawing on the left in FIG. 5. Accordingly, the number of difference pixels DP is greater on the line La than on the line Lb when it is assumed that the detection area A1 is filled with the difference pixels DP. For this reason, the three-dimensional object detection unit 33 performs normalization based on the distance that the lines La, Lb in the direction in which the three-dimensional object collapses and the detection area A1 overlap when the vertical-axis position is decided from the count number of the difference pixels DP. In a specific example, there are six difference pixels DP on the line La and there are five difference pixels DP on the line Lb in the drawing on the left in FIG. 5. Accordingly, when the vertical-axis position is decided from the count number in FIG. 5, the three-dimensional object detection unit 33 divides the count number by the overlapping distance or performs normalization in another manner. The values of the difference waveform $DW_t$ that correspond to the lines La, Lb in the direction in which the three-dimensional object collapses are thereby made to be substantially the same.

After the difference waveform $DW_t$ has been generated, the three-dimensional object detection unit 33 calculates the movement distance by comparing the difference waveform $DW_t$ at the current moment and the difference waveform $DW_{t-1}$ at a single moment prior. In other words, the three-dimensional object detection unit 33 calculates the movement distance from the change in time of the difference waveform $DW_t$ and the difference waveform $DW_{t-1}$.

Figure 6:
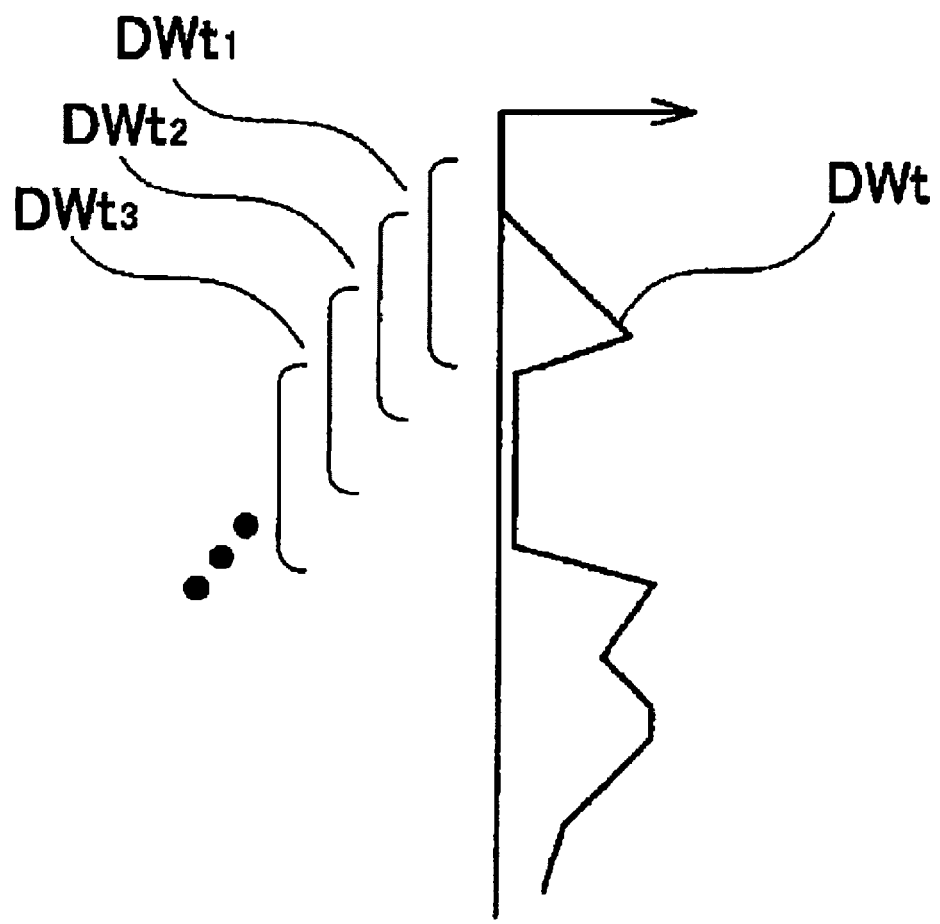
FIG. 6 is a view describing the small areas divided by the three-dimensional object detection unit.

More specifically, the three-dimensional object detection unit 33 divides the difference waveform $DW_t$ into a plurality of small areas $DW_{t1}$ to $DW_{tn}$ (where n is an arbitrary integer of 2 or greater), as illustrated in FIG. 6. FIG. 6 is a view illustrating the small areas $DW_{t1}$ to $DW_{tn}$ divided by the three-dimensional object detection unit 33. The small areas $DW_t$ to $DW_{tn}$ are divided so as to be mutually overlapping, as illustrated in, e.g., FIG. 6. For example, the small area $DW_{t1}$ and the small area $DW_{t2}$ overlap each other, and the small area $DW_{t2}$ and the small area $DW_{t3}$ overlap each other.

Next, the three-dimensional object detection unit 33 determines the offset amount (the amount of movement in the horizontal-axis direction (vertical direction in FIG. 6) of the difference waveform) for each of the small areas $DW_{t1}$ to $DW_{tn}$. Here, the offset amount is determined from the difference (distance in the horizontal-axis direction) between the difference waveform $DW_{t-1}$ at a single moment prior and the difference waveform $DW_t$ at the current moment. In this case, the three-dimensional object detection unit 33 moves the difference waveform $DW_{t-1}$ at a single moment prior in the horizontal-axis direction for each of the small areas $DW_{t1}$ to $DW_{tn}$, and thereupon assesses the position (the position in the horizontal-axis direction) in which the error from the difference waveform $DW_t$ at the current moment is at a minimum, and determines as the offset amount the movement amount in the horizontal-axis direction at the position in which the error from the original position of the difference waveform $DW_{t-1}$ is at a minimum. The three-dimensional object detection unit 33 then counts the offset amount determined for each of the small areas $DW_{t1}$ to $DW_{tn}$ and forms a histogram.

Figure 7:
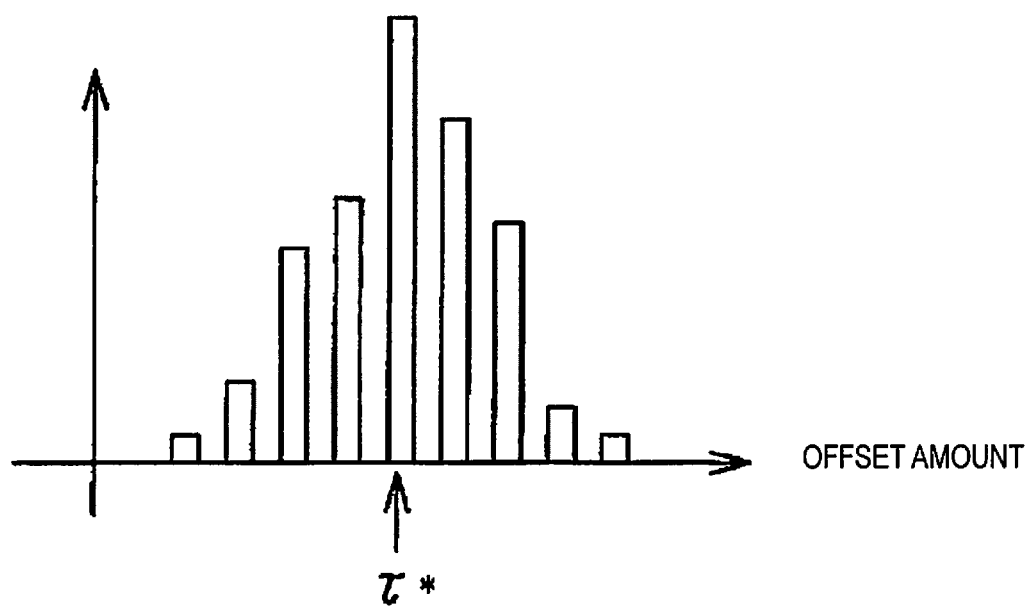
FIG. 7 is a view illustrating an example of the histogram obtained by the three-dimensional object detection unit.

FIG. 7 is a view illustrating an example of the histogram obtained by the three-dimensional object detection unit 33. As illustrated in FIG. 7, some amount of variability occurs in the offset amount, which is the movement distance in which the error between the small areas $DW_{t1}$ to $DW_{tn}$ and the difference waveform $DW_{t-1}$ at a single moment prior is at a minimum. Accordingly, the three-dimensional object detection unit 33 forms the offset amounts including the variability into a histogram and calculates the movement distance from the histogram. At this point, the three-dimensional object detection unit 33 calculates the movement distance of the three-dimensional object from the maximum value in the histogram. In other words, in the example illustrated in FIG. 7, the three-dimensional object detection unit 33 calculates the offset amount indicating the maximum value of the histogram as the movement distance $\tau^*$. In this manner, in the present embodiment, a more highly accurate movement distance can be calculated from the maximum value, even when there is variability in the offset amount. The movement distance $\tau^*$ is the relative movement distance of the three-dimensional object in relation to the host vehicle. Accordingly, the three-dimensional object detection unit 33 calculates the absolute movement distance based on the movement distance $\tau^*$ thus obtained and the speed sensor 20 when the absolute movement distance is to be calculated.

In this manner, in the present embodiment, the movement distance of the three-dimensional object is calculated from the offset amount of the difference waveform $DW_t$ when the error in the difference waveform $DW_t$ generated at different moments is at a minimum, and this allows the movement distance to be calculated from the offset amount, which is information about one dimension in a waveform, and allows computation cost to be kept low when the movement distance is calculated. Also, dividing the difference waveform $DW_t$ generated at different moments into a plurality of small areas $DW_{t1}$ to $DW_{tn}$ allows a plurality of waveforms representing the locations of the three-dimensional object to be obtained, thereby allowing the offset amount at each location of the three-dimensional object to be determined and allowing the movement distance to be determined from a plurality of offset amounts. Therefore, precision of calculating the movement distance can be improved. In the present embodiment, the movement distance of the three-dimensional object is calculated from the change in time of the difference waveform $DW_t$, which includes height direction information. Consequently, in contrast to the focus being solely on the movement of a single point, the detection location prior to change in time and the detection location after change in time are specified with height direction information included and accordingly readily end up being the same location; the movement distance is calculated from the change in time at the same location; and the precision for calculating the movement distance can be improved.

Figure 8:
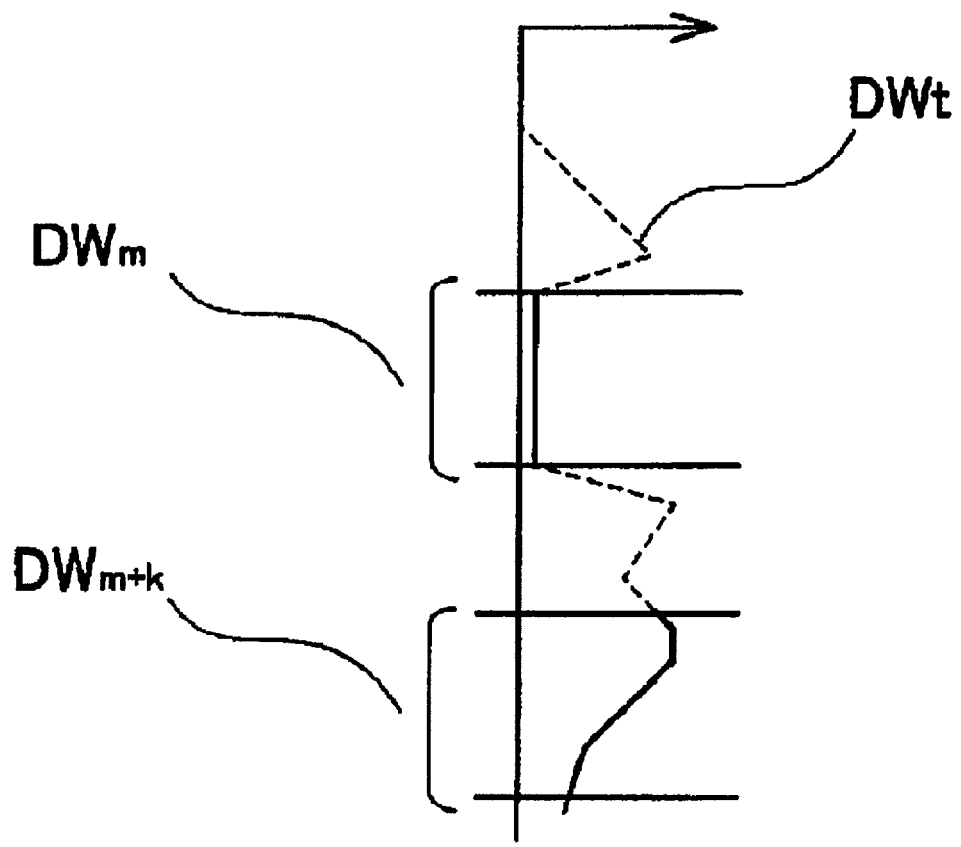
FIG. 8 is a view illustrating the weighting used by the three-dimensional object detection unit.

When a histogram is to be formed, the three-dimensional object detection unit 33 may impart a weighting to the plurality of small areas $DW_{t1}$ to $DW_{tn}$, and count the offset amounts determined for each of the small areas $DW_{t1}$ to $DW_{tn}$, in accordance with the weighting to form a histogram. FIG. 8 is a view illustrating the weighting used by the three-dimensional object detection unit 33.

As illustrated in FIG. 8, a small area $DW_m$ (where m is an integer 1 or greater and n−1 or less) is flat. In other words, in the small area $DW_m$, there is little difference between the maximum and minimum values of the count of number of pixels indicating a predetermined difference. The three-dimensional object detection unit 33 reduces the weighting of this type of small area $DW_m$. This is because the flat small area $DW_m$ lacks a characteristic and there is a high possibility that an error will be magnified when the offset amount is calculated.

On the other hand, a small area $DW_{m+k}$ (where k is an integer n−m or less) has abundant undulation. In other words, in the small area $DW_{m+k}$, there is considerable difference between the maximum and minimum values of the count of number of pixels indicating a predetermined difference. The three-dimensional object detection unit 33 increases the weighting of this type of small area $DW_{m+k}$. This is because the small area $DW_{m+k}$ abundant in undulation is characteristic and there is a high possibility that the offset amount will be accurately calculated. Weighting the small areas in this manner makes it possible to enhance the precision for calculating the movement distance.

The difference waveform $DW_t$ is divided into a plurality of small areas $DW_{t1}$ to $DW_{tn}$, in the present embodiment in order to enhance the precision for calculating the movement distance, but division into the small areas $DW_{t1}$ to $DW_{tn}$ is not required when the precision for calculating movement distance is not so needed. In this case, the three-dimensional object detection unit 33 calculates the movement distance from the offset amount of the difference waveform $DW_t$ when the error between the difference waveform $DW_t$ and the difference waveform $DW_{t-1}$ is at a minimum. In other words, the method for determining the offset amount between the difference waveform $DW_{t-1}$ at a single moment prior and the difference waveform $DW_t$ at the current moment is not limited to the details described above.

The three-dimensional object detection unit 33 in the present embodiment determines the movement speed of the host vehicle V1 (camera 10) and determines the offset amount for a stationary object from the determined movement speed. After the offset amount of the stationary object has been determined, the three-dimensional object detection unit 33 ignores the offset amount that corresponds to the stationary object within the maximum value of the histogram, and calculates the movement distance of the three-dimensional object.

Figure 9:
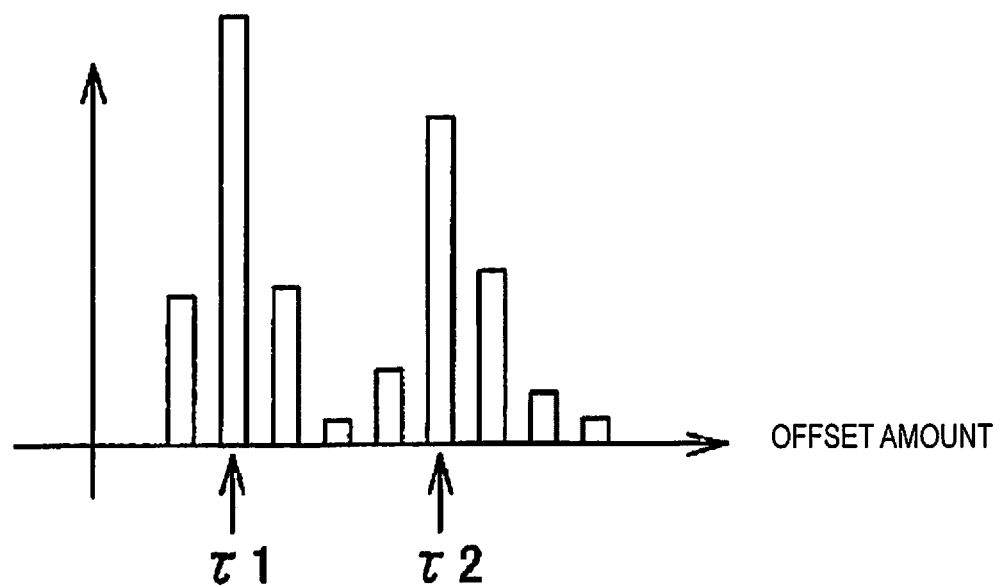
FIG. 9 is a view illustrating another example of the histogram obtained by the three-dimensional object detection unit.

FIG. 9 is a view illustrating another example of the histogram obtained by the three-dimensional object detection unit 33. When a stationary object other than the three-dimensional object is present within the view angle of the camera 10, two maximum values $\tau 1$, $\tau 2$ appear in the resulting histogram. In this case, one of the two maximum values $\tau 1$, $\tau 2$ is the offset amount of the stationary object. Consequently, the three-dimensional object detection unit 33 determines the offset amount for the stationary object from the movement speed, ignores the maximum value that corresponds to the offset amount, and calculates the movement distance of the three-dimensional object using the remaining maximum value. It is thereby possible to prevent a situation in which the precision for calculating the movement distance of the three-dimensional object is reduced by the stationary object.

Even when the offset amount corresponding to the stationary object is ignored, there may be a plurality of three-dimensional objects present within the view angle of the camera 10 when there is a plurality of maximum values. However, a plurality of three-dimensional objects present within the detection areas A1, A2 occurs very rarely. Accordingly, the three-dimensional object detection unit 33 stops calculating the movement distance. In the present embodiment, it is thereby possible to prevent a situation in which an errant movement distance is calculated such as when there is a plurality of maximum values.

Furthermore, the three-dimensional object detection unit 33 calculates the relative movement speed of the three-dimensional object by time-differentiating the relative movement distance of the three-dimensional object. The three-dimensional object detection unit 33 also calculates the absolute movement speed of the three-dimensional object based on the relative movement distance of the three-dimensional object. Additionally, the three-dimensional object detection unit 33 repeatedly calculates the relative movement speed of the three-dimensional object at predetermined intervals, and calculates the amount ΔV of change in time of the relative movement speed of the repeatedly calculated three-dimensional object. The amount ΔV of change in time of the calculated relative movement speed is transmitted to a later-described three-dimensional object assessment unit 34.

The three-dimensional object assessment unit 34 illustrated in FIG. 3 assesses whether a three-dimensional object detected by the three-dimensional object detection unit 33 is another vehicle (adjacent vehicle) traveling in an adjacent lane. In assessing whether the three-dimensional object is an adjacent vehicle, the three-dimensional object assessment unit 34 also detects the amount of variability in the image information, and assesses whether the three-dimensional object is a non-detection object based on the amount of variability in the detected image information. In the present embodiment, the three-dimensional object assessment unit 34 calculates, as the amount of variability in the image information, the absolute value |ΔV| of the amount of change in time in the relative movement speed of the three-dimensional object calculated by the three-dimensional object detection unit 33 based on the captured image, and assesses whether the three-dimensional object is a non-detection object based on the calculated absolute value |ΔV|. As used herein, the term "non-detection object" refers to plants, snow, guardrails, and the like which are objects that are not to be detected, in contrast to adjacent vehicles, which are to be detected. Thus, in the present embodiment, the three-dimensional object assessment unit 34 assesses whether a three-dimensional object is a non-detection object, thereby effectively preventing a non-detection object from being errantly detected as an adjacent vehicle.

Figure 10:
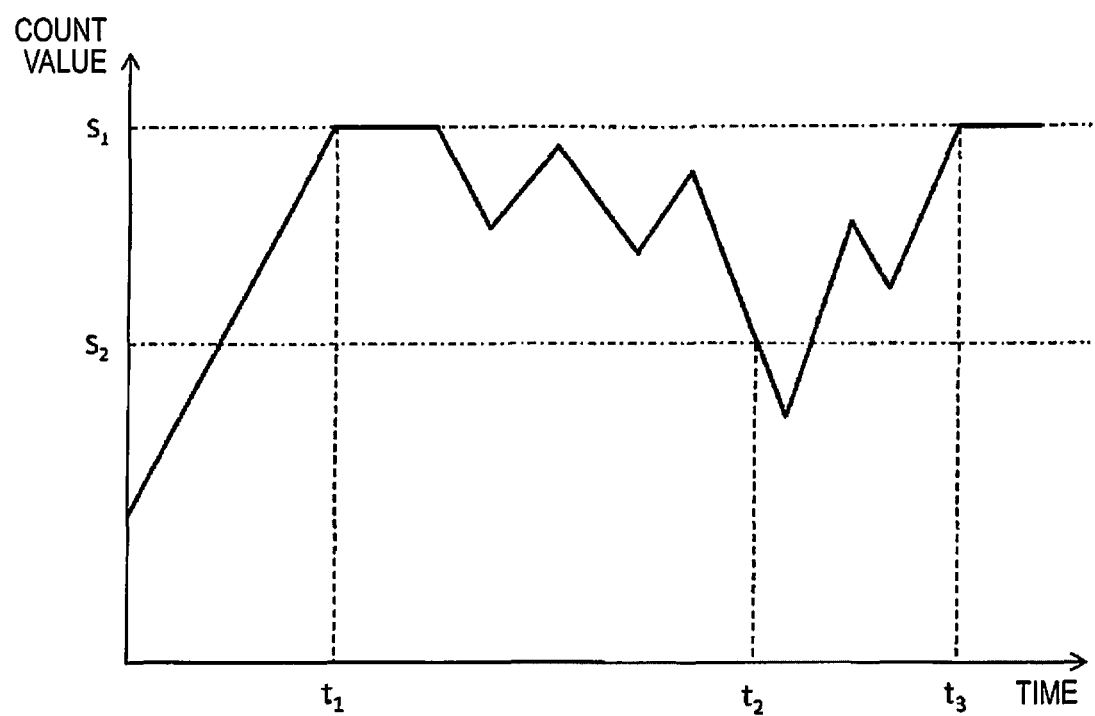
FIG. 10 is a view describing the method for assessing an object that is not to be detected.

Specifically, the three-dimensional object assessment unit 34 determines that the higher the amount of variability in the image information is, the greater the absolute value |ΔV| of the amount of change in time of the relative movement speed of the three-dimensional object is, and determines that the possibility that the detected three-dimensional object is a non-detection object is high. In the present embodiment, the three-dimensional object assessment unit 34 increases or decreases the count value (vertical axis illustrated in FIG. 10) in accordance with the absolute value |ΔV| of the amount of change in time of the relative movement speed of the three-dimensional object, as illustrated in FIG. 10, and as a result, assesses the detected three-dimensional object to be a non-detection object when the count value is at a first threshold value $s_1$ or greater. FIG. 10 is a view describing the method for detecting a non-detection object.

Described here is the count value for detecting a non-detection object. FIG. 11 is a table for illustrating an example of the increase/decrease amount of the count value. The three-dimensional object assessment unit 34 modifies the increase/decrease amount of the count value based on the brightness (day/night) of the detection areas A1, A2 and the magnitude of the absolute value |ΔV| of the amount of change in time of the relative movement speed of the three-dimensional object, as illustrated in FIG. 11.

For example, the three-dimensional object assessment unit 34 detects the brightness of the detection areas A1, A2 from the difference image, and, when the brightness of the detection areas A1, A2 is at a predetermined value or higher (when daytime can be determined), determines the possibility to be high that the three-dimensional object is a non-detection object having considerable variability in the edge components and other image information when the absolute value |ΔV| of the amount of change in time of the relative movement speed of the three-dimensional object is 30 km/h or greater (when |ΔV|≥30 km/h), and increases the count value by X1, as shown in FIG. 11. When the brightness of the detection areas A1, A2 is less than a predetermined value (i.e., when nighttime can be determined), the three-dimensional object assessment unit 34 increases the count value by X2 when the absolute value |ΔV| of the amount of change in time of the relative movement speed of the three-dimensional object is 30 km/h or greater (when |ΔV|≥30 km/h). In this case, X2 is a smaller value than X1 (X1>X2). This is due to the fact that when it is nighttime (when the brightness is less than a predetermined value), the contrast of the captured image is low and the degree of certainty that the three-dimensional object can be assessed to be a non-detection object is low.

When the brightness is at a predetermined value or greater (when nighttime can be determined), the three-dimensional object assessment unit 34 determines the possibility to be low that the three-dimensional object is a non-detection object having considerable variability in the edge components and other image information when the absolute value |ΔV| of the amount of change in time of the relative movement speed of the three-dimensional object is less than 30 km/h and 10 km/h or greater (30 km/h>|ΔV|≥10 km/h), and decreases the count value by Y1, as illustrated in FIG. 11. When the brightness is less than a predetermined value (i.e., when nighttime can be determined), the three-dimensional object assessment unit 34 decreases the count value by Y2 when the absolute value |ΔV| of the amount of change in time of the relative movement speed of the three-dimensional object less than 30 km/h and 10 km/h or greater (when 30 km/h>|ΔV|≥10 km/h). In this case, Y2 is a smaller value than Y1 (Y1>Y2) in the same manner as X1, X2.

Furthermore, when the brightness is at a predetermined value or greater (when daytime can be determined), the three-dimensional object assessment unit 34 furthermore determines the possibility to be high that the three-dimensional object is a non-detection object having considerable variability in the edge component and other image information when the absolute value |ΔV| of the amount of change in time of the relative movement speed of the three-dimensional object is less than 10 km/h (10 km/h>absolute value |ΔV|), and decreases the count value by Z1, as illustrated in FIG. 11. In this case, Z1 is a value greater than Y1 (Z1>Y1). This is due to the face that, when the absolute value |ΔV| of the amount of change in time of the relative movement speed of the three-dimensional object is less than 10 km/h (10 km/h>absolute value |ΔV|), the possibility that the three-dimensional object is an adjacent vehicle is higher and the degree of certainty that the three-dimensional object can be assessed to be a non-detection object is lower in comparison with when the absolute value |ΔV| of the amount of change in time of the relative movement speed of the three-dimensional object is less than 30 km/h and 10 km/h [or greater] (30 km/h>absolute value $|\Delta V| \geq 10$ km/h). Also, when the brightness is less than a predetermined value (when daytime can be determined), the three-dimensional object assessment unit 34, the three-dimensional object assessment unit 34 decreases the count value by Z2 when the absolute value $|\Delta V|$ of the amount of change in time of the relative movement speed of the three-dimensional object is less than 10 km/h (10 km/h>absolute value $|\Delta V|$). In this case, Z2 is a value greater than Y2, in the same manner as Z1 (Z1>Z2), and Z2 is a value less than Z1 (Z1>Z2), in the same manner as X1 and X2.

As a result of increasing or decreasing the count value in accordance with the variability of the absolute value $|\Delta V|$ of the amount of change in time of the relative movement speed of the three-dimensional object, as illustrated in FIG. 11, the three-dimensional object assessment unit 34 assesses that the three-dimensional object is a non-detection object when the count value is at the first threshold value $s_1$ or greater illustrated in FIG. 10

Furthermore, the three-dimensional object assessment unit 34 cancels the assessment that the three-dimensional object is a non-detection object after the count value has become the first threshold value $s_1$ or greater and the count value is furthermore less than a second threshold value $s_2$, as illustrated in FIG. 10. For example, in the example illustrated in FIG. 10, the count value is at the first threshold value $s_1$ or greater at time t1, so it is assessed that the detected three-dimensional object is a non-detection object at time t1, and thereafter, at time t2, the count value is less than the second threshold value $s_2$, and it is therefore assessed that the detected three-dimensional object is not a non-detection object at time t2. Furthermore, in the example illustrated in FIG. 10, the count value again becomes the first threshold value $s_1$ or greater at time t3, and it is therefore assessed that the detected three-dimensional object is a non-detection object at time t3.

In the example illustrated in FIG. 10, the first threshold value $s_1$ is provided as an upper limit value so that the count value does not become the first threshold value $s_1$ or greater when the absolute value $|\Delta V|$ of the amount of change in time of the relative movement speed of the three-dimensional object is 30 km/h or greater (absolute value $|\Delta V| \geq 30$ km/h). The count value having become a value equal to the first threshold value $s_1$ can thereby be rapidly reduced to less than the second threshold value $s_2$ in the present embodiment when an adjacent vehicle traveling in the adjacent lane has actually been detected, thereby allowing suitable detection of an adjacent vehicle. In the example illustrated in FIG. 10, the first threshold value $s_1$ is set as the upper limit value of the count value, but no limitation is imposed thereby, and it is also possible to set a value greater than the first threshold value $s_1$ as the upper limit value of the count value, or to set a value less than the first threshold value $s_1$ as the upper limit value of the count value.

The three-dimensional object assessment unit 34 increase or decreases the count value in this manner to thereby assess whether a three-dimensional object detected by the three-dimensional object detection unit 33 is a non-detection object, and inhibits detection of the detected three-dimensional object as an adjacent vehicle when the detected three-dimensional object has been assessed to be a non-detection object. It is thereby possible to effectively prevent plant growths and other non-detection objects from being errantly detected as an adjacent vehicle.

Figure 12:
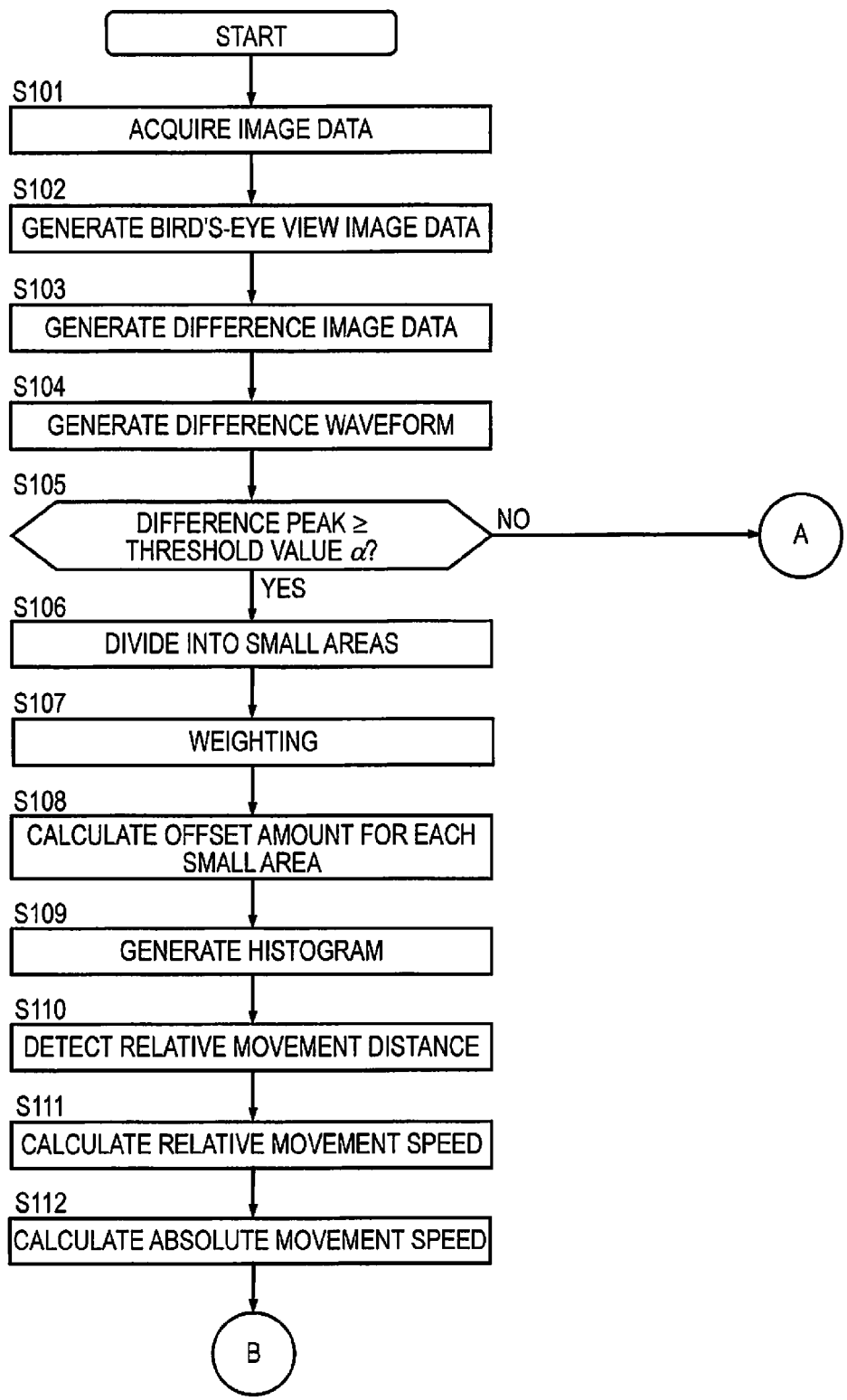
FIG. 12 is a first part of a flowchart illustrating the method for detecting an adjacent vehicle.
Figure 13:
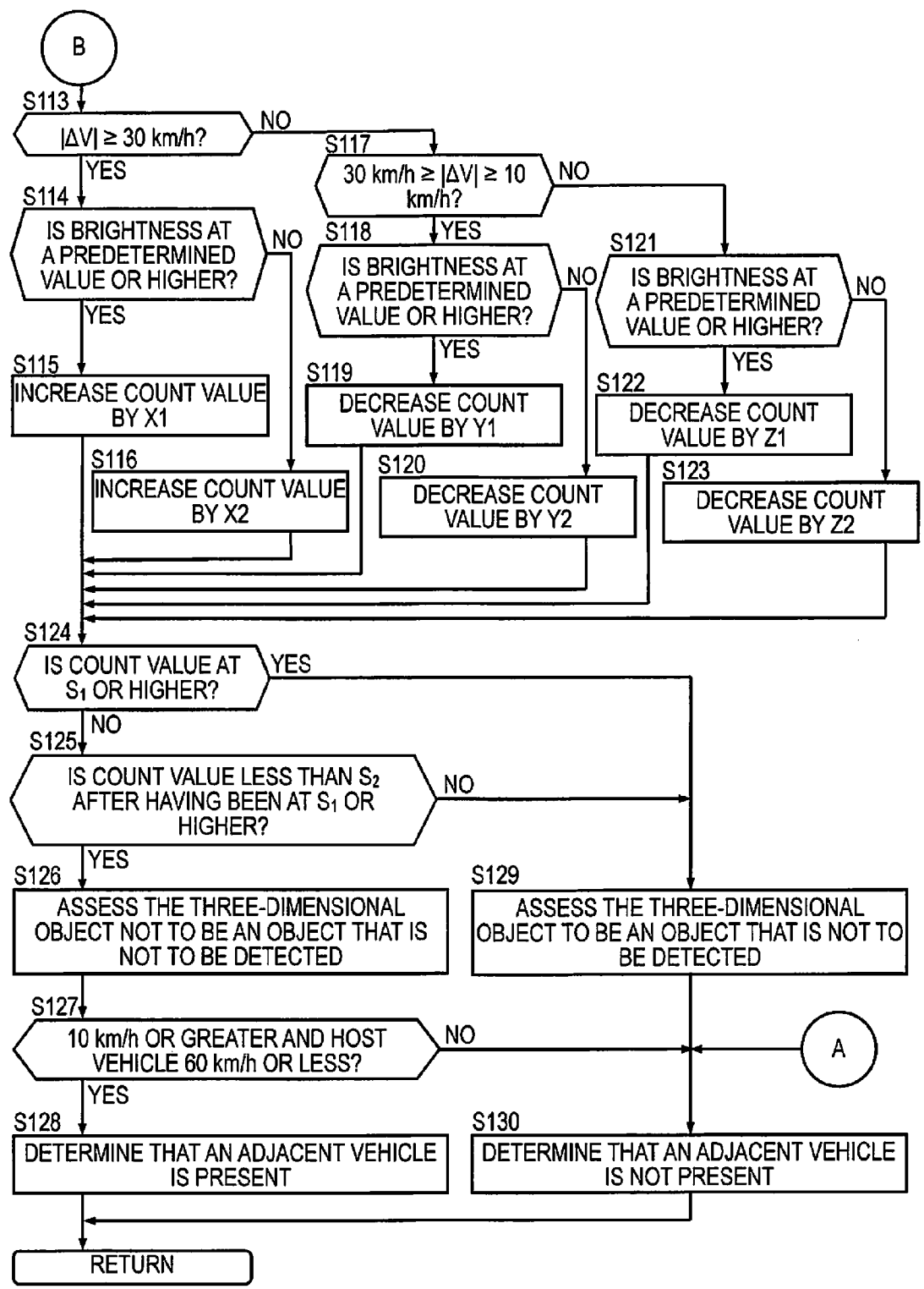
FIG. 13 is a second part of a flowchart illustrating the method for detecting an adjacent vehicle.

Described next is the process for detecting an adjacent vehicle in accordance with the present embodiment. FIGS. 12 and 13 are flowcharts illustrating processes for detecting an adjacent vehicle according to the present embodiment. First, data of a captured image P is acquired by the computer 30 from the camera 10 (step S101), and data of a bird's-eye view image $PB_t$ is generated (step S102) based on the data of the captured image P thus acquired, as illustrated in FIGS. 12 and 13.

Next, the alignment unit 32 aligns the bird's-eye view image $PB_t$ data and the bird's-eye view image $PB_{t-1}$ data at a single moment prior, and generates difference image $PD_t$ data (step S103). The three-dimensional object detection unit 33 then counts the number of difference pixels DP having a pixel value of "1" to generate a difference waveform $DW_t$ from the difference image $PD_t$ data (step S104).

The three-dimensional object detection unit 33 then determines whether a peak in the difference waveform $DW_t$ is at a predetermined threshold value $\alpha$ or greater (step S105). When the peak of the difference waveform $DW_t$ is not at the threshold value a or greater, i.e., when there is essentially no difference, it is possible that a three-dimensional object is not present in the captured image P. Accordingly, when it has been determined that the peak of the difference waveform $DW_t$ is not at the threshold value a or greater (step S105=No), the three-three-dimensional object detection unit 33 determines that another vehicle is not present in that a three-dimensional object is not present (step S130 in FIG. 13).

On the other hand, when the peak in the difference waveform $DW_t$ is determined to be at a threshold value $\alpha$ or greater (step S105=Yes), the three-dimensional object detection unit 33 determines that a three-dimensional object is present in the adjacent lane and proceeds to step S106 where the difference waveform $DW_t$ is divided into a plurality of small areas $DW_{t1}$ to $DW_{tn}$, by the three-dimensional object detection unit 33. The three-dimensional object detection unit 33 next imparts weighting to each of the small areas $DW_{t1}$ to $DW_{tn}$ (step S107), calculates the offset amount for each of the small areas $DW_{t1}$ to $DW_{tn}$ (step S108), and generates a histogram with consideration given to the weightings (step S109).

The three-dimensional object detection unit 33 calculates the relative movement distance, which is the movement distance of the adjacent vehicle in relation to the host vehicle, based on the histogram (step S110), and time-differentiates the calculated relative movement distance to thereby calculate the relative movement speed (step S111). The three-dimensional object detection unit 33 furthermore adds the host vehicle speed detected by the speed sensor 20 and calculates the absolute movement speed of the adjacent vehicle (step S112).

Proceeding to FIG. 13, the three-dimensional object assessment unit 34 determines (step S113) whether the absolute value $|\Delta V|$ of the amount of change in time of the relative movement speed of the three-dimensional object is at 30 km/h or higher (absolute value $|\Delta V| \geq 30$ km/h). When the absolute value $|\Delta V|$ of the amount of change in time of the relative movement speed of the three-dimensional object is at 30 km/h or higher (absolute value $|\Delta V| \geq 30$ km/h (step S113=Yes)) and when the brightness of the detection area A1 is at a predetermined value or greater (step S114=Yes), the count value is increased by X1 (step S115), as illustrated in FIG. 11. When the absolute value $|\Delta V|$ of the amount of change in time of the relative movement speed of the three-dimensional object is 30 km/h or higher (absolute value $|\Delta V| \geq 30$ km/h (step S113=Yes)) and when the brightness of the detection area A1 is less than the predetermined value (step S114=No), the three-dimensional object assessment unit 34 increases the count value by X2 (step S116), as illustrated in FIG. 11.

When the absolute value $|\Delta V|$ of the amount of change in time of the relative movement speed of the three-dimensional object is less than 30 km/h and 10 km/h or higher (30 km/h>absolute value $|\Delta V| \geq 10$ km/h (step S117=Yes)), and when the brightness of the detection area A1 is at a predetermined value or greater (step S118=Yes), the three-dimensional object assessment unit 34 decreases the count value by Y1 (step S119), as illustrated in FIG. 11. Also, when the absolute value |ΔV| of the amount of change in time of the relative movement speed of the three-dimensional object is less than 30 km/h and 10 km/h or higher (30 km/h>absolute value |ΔV|≥10 km/h (step S117=Yes)), and when the brightness of the detection area A1 is less than the predetermined value (step S118=No), the three-dimensional object assessment unit 34 decreases the count value by Y2 (step S120), as illustrated in FIG. 11.

Furthermore, when the absolute value |ΔV| of the amount of change in time of the relative movement speed of the three-dimensional object is less than 10 km/h (10 km/h >absolute value |ΔV| (step S117=No)), and when the brightness of the detection area A1 is at a predetermined value or greater (step S121=Yes), the three-dimensional object assessment unit 34 decreases the count value by Z1 (step S122), as illustrated in FIG. 11. When the absolute value |ΔV| of the amount of change in time of the relative movement speed of the three-dimensional object is less than 10 km/h (step S117=No), and when the brightness of the detection area A1 is less than the predetermined value (step S121=No), the three-dimensional object assessment unit 34 decreases the count value by Z2 (step S123), as illustrated in FIG. 11.

In step S124, the three-dimensional object assessment unit 34 determines whether the count value is at the first threshold value $s_1$ or greater illustrated in FIG. 10. The process proceeds to step S129 when the count value is at the first threshold value $s_1$ or greater, and the detected three-dimensional object is assessed to be a non-detection object by the three-dimensional object assessment unit 34. The process thereafter proceeds to step S130, and an adjacent vehicle is determined not to be present in an adjacent lane by the three-dimensional object assessment unit 34. On the other hand, when the count value is less than the first threshold value $s_1$, the process proceeds to step S125.

In step S125, after the count value has become equal to or greater than the first threshold value $s_1$, the three-dimensional object assessment unit 34 determines whether the count value has become less than the first threshold value $s_1$ illustrated in FIG. 10 and has furthermore become less than the second threshold value $s_2$. In other words, the count value, having once become the first threshold value $s_1$ or greater, decreases, and after the count value has become less than the first threshold value $s_1$, the process proceeds to step S129 when the count value has become the second threshold value $s_2$ or greater. The three-dimensional object assessment unit 34 assesses whether the detected three-dimensional object is a non-detection object, and the three-dimensional object assessment unit 34 thereafter determines that an adjacent vehicle is not present in an adjacent lane (step S129). On the other hand, after the count value has become less than the first threshold value $s_1$, and when the count value has furthermore become less than the second threshold value $s_2$, the process proceeds to step S126, the detected three-dimensional object is assessed not to be a non-detection object by the three-dimensional object assessment unit 34, and the process proceeds to step S127. When the count value has not once become equal to or greater than the first threshold value $s_1$, the process naturally proceeds to step S126 when the count value is less than the first threshold value $s_1$ and is at the second threshold value $s_2$ or greater.

In step S127, the three-dimensional object assessment unit 34 determines whether the absolute movement speed of the adjacent vehicle is 10 km/h or more and whether the relative movement speed of the adjacent vehicle in relation to the host vehicle is +60 km/h or less. When both conditions are satisfied (step S127=Yes), the three-dimensional object assessment unit 34 determines that an adjacent vehicle is present in the adjacent lane (step S128). On the other hand, when either condition is not satisfied (step S127=No), the three-dimensional object assessment unit 34 determines that an adjacent vehicle is not present in the adjacent lane (step S130). The process then returns step S101 illustrated in FIG. 13 and repeats the above-described processing.

In the present embodiment, the detection areas A1, A2 are the rearward side directions of the host vehicle, and focus is placed on whether the host vehicle may possibly make contact with an adjacent vehicle should a lane change be made. Accordingly, the process of step S127 is implemented. In other words, assuming that the system in the present embodiment is actuated on an expressway, when the speed of an adjacent vehicle is less than 10 km/h, it would rarely be a problem even if an adjacent vehicle were to be present because the adjacent vehicle would be positioned far behind the host vehicle when a lane change is made. Similarly, when the relative movement speed of an adjacent vehicle exceeds +60 km/h in relation to the host vehicle (i.e., when the adjacent vehicle is moving at a speed 60 km/h greater than the speed of the host vehicle), it would rarely be a problem because the adjacent vehicle would be positioned ahead of the host vehicle when a lane change is made. Accordingly, it can be construed that an adjacent vehicle, which would be a problem should a lane change is made, is being determined in step S127.

In step S127, it is determined whether the absolute movement speed of the adjacent vehicle is 10 km/h or greater, and whether the relative movement speed of the adjacent vehicle in relation to the host vehicle is +60 km/h or less, thereby obtaining the following effect. For example, a possible case is that the absolute movement speed of a stationary object is detected to be several kilometers per hour depending on the attachment error of the camera 10. Accordingly, determining whether the speed is 10 km/h or greater makes it possible to reduce the possibility that the stationary object will be determined to be an adjacent vehicle. Also, it is possible that the relative speed of an adjacent vehicle in relation to the host vehicle will be detected to be in excess of +60 km/h due to noise. Accordingly, determining whether the relative speed is +60 km/h or less makes it possible to reduce the possibility of errant detection due to noise.

In lieu of the processing in step S127, it may be determined that the absolute movement speed of the adjacent vehicle is not a negative value, or is not 0 km/h. Also, in the present embodiment, since focus is placed on whether there is a possibility that contact will be made should the host vehicle make a lane change, a warning sound may be emitted to the driver of the host vehicle, or a display corresponding to a warning may be provided by a predetermined display device when a adjacent vehicle has been detected in step S128.

Thus, in the first embodiment, two images obtained at different moments are converted to bird's-eye view images, and a difference image $PD_t$ is generated based on the difference between the bird's-eye view images. The number of pixels that indicate a predetermined difference is counted along the direction in which the three-dimensional object collapses due to viewpoint conversion and a frequency distribution is formed to thereby generate a difference waveform $DW_t$ from the difference image $PD_t$ data. A three-dimensional object is furthermore detected based on the generated difference waveform $DW_t$, and it is assessed whether the detected three-dimensional object is a plant, snow, guardrail, or other non-detection object based on the absolute value |ΔV| of the amount of change in time of the relative movement speed of the detected three-dimensional object. In this case, for example, discontinuous edge components tend to be detected in considerable numbers when a captured image in which plants, snow, guardrails, or other non-detection objects have been captured is subjected to edge processing. This is due to the fact that image information of non-detection objects tend to have a high amount of image information variability. Accordingly, in the present embodiment, the absolute value |ΔV| of the amount of change in time of the relative movement speed of a three-dimensional object is detected as the amount of variability in the image information, and determining a three-dimensional object to be a non-detection object in commensurate fashion to the magnitude of the detected absolute value |ΔV| allows plants, snow, guardrails, or other non-detection objects to be suitably detected and thereby makes it possible to effectively prevent a non-detection object from being errantly detected as an adjacent vehicle.

Conversely, in the present embodiment, it is determined the possibility that the detected three-dimensional object is a vehicle is higher in commensurate fashion to a lower absolute value |ΔV| of the amount of change in time of the relative movement speed of the three-dimensional object, and as a result, the detected three-dimensional object is more readily determined to be another vehicle and a three-dimensional object can therefore be suitably detected.

Also, in the present embodiment, when the absolute value |ΔV| of the amount of change of the relative movement speed of the three-dimensional object is high, the count value is increased, and when the cumulative count value has reached the first threshold value $s_1$ or greater, the detected three-dimensional object is assessed to be a non-detection object, thereby allowing the precision for detecting a non-detection object to be enhanced. Similarly, even after the count value has reached the first threshold value $s_1$, the three-dimensional object is assessed to be a non-detection object until the count value is less than the second threshold value $s_2$, and when the count value has become less than the second threshold value $s_2$, the three-dimensional object is assessed not to be a non-detection object, thereby allowing the precision for detecting a non-detection object to be enhanced.

Figure 14:
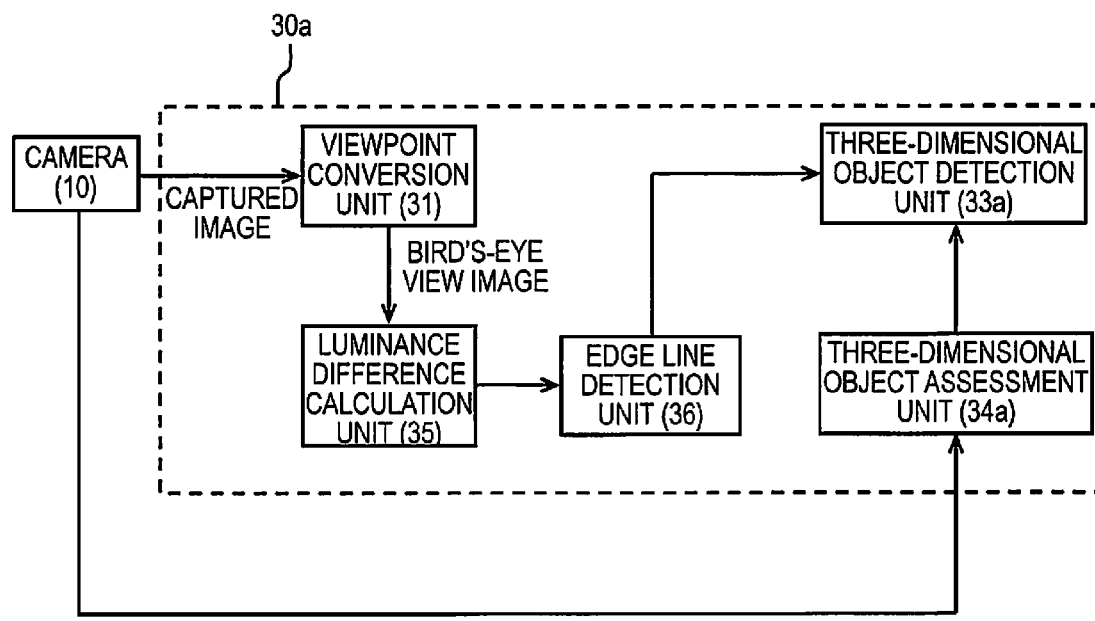
FIG. 14 is a block diagram illustrating the details of the computer according to a second embodiment.

Described next is a three-dimensional object detection device 1a according to the second embodiment. The three-dimensional object detection device 1a according to the second embodiment is the same as the first embodiment, except that a computer 30a is provided in lieu of the computer 30 of the first embodiment, as illustrated in FIG. 14, and the operation is as described below. Here, FIG. 14 is a block view illustrating the details of the computer 30a according to the second embodiment.

The three-dimensional object detection device 1a according to the second embodiment is provided with a camera 10 and a computer 30a, as illustrated in FIG. 14. The computer 30a is provided with a viewpoint conversion unit 31, a luminance difference calculation unit 35, an edge line detection unit 36, a three-dimensional object detection unit 33a, and a three-dimensional object assessment unit 34a. The configuration of the three-dimensional object detection device 1a according to the second embodiment is described below.

Figure 15:
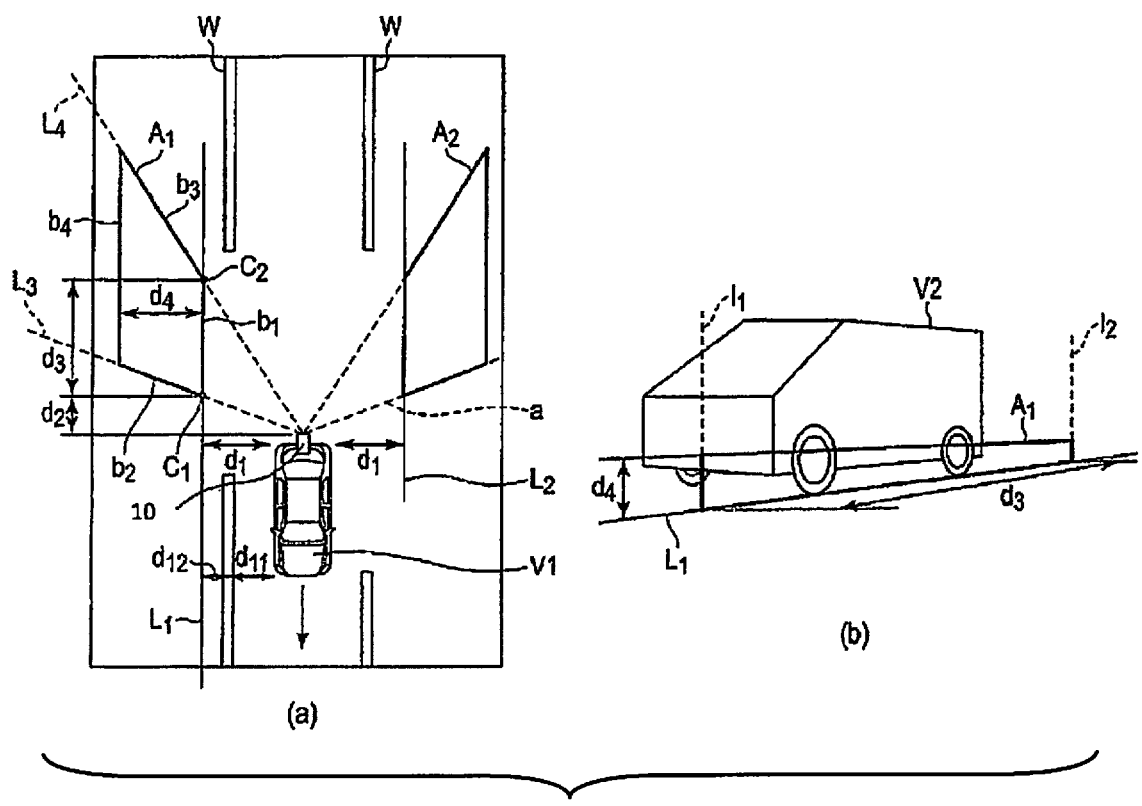
FIG. 15 is a view illustrating the travel state of the vehicle, with part (a) illustrating the positional relationship between the detection area and the like from a top plan view, and part (b) illustrating the positional relationship between the detection area and the like in real space in perspective.

FIG. 15 is a view illustrating the image range of the camera 10 in FIG. 14, with part (a) of FIG. 15 being a plan view, and part (b) of FIG. 15 being a perspective view in real space rearward from the host vehicle V1. The camera 10 is set to a predetermined view angle a, and the rearward side of the host vehicle V1 included in the predetermined view angle a is captured, as illustrated in part (a) of FIG. 15. The view angle a of the camera 10 is set so that adjacent lanes are included in the capture range of the camera 10 in addition to the lane in which the host vehicle V1 is traveling, in the same manner as illustrated in FIG. 2.

The detection areas A1, A2 in the present example are trapezoidal in a plan view (bird's-eye view state), the position, size, and shape of the detection areas A1, A2 are decided based on distances $d_1$ to $d_4$. The detection areas A1, A2 of the example illustrated in the drawing are not limited to being trapezoidal, and may also be rectangular or another shape in a bird's-eye view state, as illustrated in FIG. 2.

Here, the distance d1 is the distance from the host vehicle V1 to the ground lines L1, L2. The ground lines L1, L2 refer to a line in which a three-dimensional object, which is present in a lane adjacent to the lane in which the host vehicle V1 is traveling, is in contact with the ground. In the present embodiment, an object is to detect an adjacent vehicle V2 or the like (including two-wheeled vehicles or the like) traveling in the left or right lane behind the host vehicle V1 and adjacent to the lane of the host vehicle V1. Accordingly, the distance d1, which is the position of the ground lines L1, L2 of the adjacent vehicle V2, can be decided so as to be substantially fixed from the distance d11 from the host vehicle V1 to a white line W and the distance d12 from the white line W to the position in which the adjacent vehicle V2 is predicted to travel.

The distance d1 is not limited to being fixedly decided, and may be variable. In this case, the computer 30a recognizes the position of the white line W in relation to the host vehicle V1 using white line recognition or another technique, and the distance d11 is decided based on the position of the recognized white line W. The distance d1 is thereby variably set using the decided distance d11. In the present embodiment described below, the position in which the adjacent vehicle V2 is travelling (the distance d12 from the white line W) and the position in which the host vehicle V1 is travelling (the distance d11 from the white line W) is mostly predictable, and the distance d1 is fixedly decided.

A distance d2 is the distance extending from the rear end part of the host vehicle V1 in the vehicle progress direction. The distance d2 is decided so that the detection areas A1, A2 are accommodated within at least the view angle a of the camera 10. In the present embodiment in particular, the distance d2 is set so as to be in contact with a range partitioned within the view angle a. The distance d3 indicates the length of the detection areas A1, A2 in the vehicle progression direction. The distance d3 is decided based on the size of the three-dimensional object to be detected. In the present embodiment, the object to be detected is an adjacent vehicle V2 or the like, and therefore the distance d3 is set to a length that includes the adjacent vehicle V2.

The distance d4 indicates the height, which has been set so that the tires of the adjacent vehicle V2 or the like are included in real space, as illustrated in part (b) of FIG. 15. In a bird's-eye view image, the distance d4 is the length illustrated in part (a) of FIG. 15. The distance d4 may also be a length that does not include lanes further adjacent to the left and right adjacent lanes in the bird's-eye view image (i.e., adjacent-adjacent lanes two lanes away). This is because when the lanes two lanes away from the lane of the host vehicle V1 are included, it is no longer possible to distinguish whether an adjacent vehicle V2 is present in the adjacent lanes to the left and right of the lane in which the host vehicle V1 is traveling, or whether an adjacent-adjacent vehicle is present in an adjacent-adjacent lane two lanes away.

As described above, the distances d1 to d4 are decided, and the position, size, and shape of the detection areas A1, A2 are thereby decided. More specifically, the position of the top side b1 of the detection areas A1, A2 that form a trapezoid is decided by the distance d1. The starting position C1 of the top side b1 is decided by the distance d2. The end position C2 of the top side b1 is decided by the distance d3. The lateral side b2 of the detection areas A1, A2 that form a trapezoid is decided by a straight line L3 extending from the camera 10 toward the starting position C1. Similarly, the lateral side b3 of the detection areas A1, A2 that form a trapezoid is decided by a straight line L4 extending from the camera 10 toward the end position C2. The position of the lower side b4 of the detection areas A1, A2 that form a trapezoid is decided by the distance d4. In this manner, the areas surrounded by the sides b1 to b4 are the detection areas A1, A2. The detection areas A1, A2 are regular squares (rectangles) in real space rearward from the host vehicle V1, as illustrated in part (b) of FIG. 15.

Returning to FIG. 14, the viewpoint conversion unit 31 accepts input of captured image data of a predetermined area captured by the camera 10. The viewpoint conversion unit 31 converts the viewpoint of the inputted captured image data into bird's-eye view image data, which is a bird's-eye view state. A bird's-eye view state is a state of viewing from the viewpoint of an imaginary camera that is looking down from above, e.g., vertically downward (or slightly inclined downward). Viewpoint conversion can be carried out using the technique described in, e.g., Japanese Laid-Open Patent Application No. 2008-219063.

The luminance difference calculation unit 34 calculates luminance differences in the bird's-eye view image data, which has undergone viewpoint conversion by the viewpoint conversion unit 31, in order to detect the edges of a three-dimensional object included in the bird's-eye view image. The luminance difference calculation unit 34 calculates, for each of a plurality of positions along a perpendicular imaginary line extending along the perpendicular direction in real space, the luminance difference between two pixels near each position. The luminance difference calculation unit 34 is capable of calculating the luminance difference by a method for setting a single perpendicular imaginary line extending in the perpendicular direction in real space, or a method for setting two perpendicular imaginary lines.

Described below is the specific method for setting two perpendicular imaginary lines. The luminance difference calculation unit 34 sets a first perpendicular imaginary line that corresponds to a line segment extending in the perpendicular direction in real space, and a second perpendicular imaginary line that is different from the first perpendicular imaginary line and that corresponds to the line segment extending in the perpendicular direction in real space. The luminance difference calculation unit 34 determines the luminance difference between a point on the first perpendicular imaginary line and a point on the second perpendicular imaginary line in continuous fashion along the first perpendicular imaginary line and the second perpendicular imaginary line. The operation of the luminance difference calculation unit 34 is described in detail below.

Figure 16:
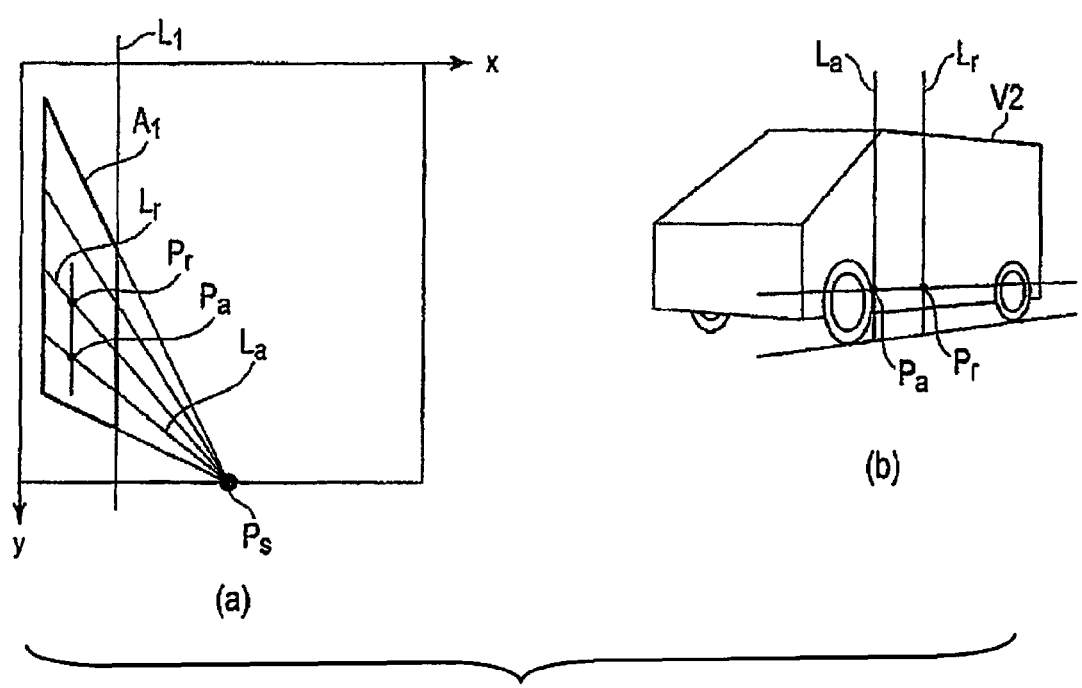
FIG. 16 is a view for describing the operation of the luminance difference calculation unit according to the second embodiment, with part (a) illustrating the positional relationship between the attention line, reference line, attention point, and reference point in a bird's-eye view image, and part (b) illustrating the positional relationship between the attention line, reference line, attention point, and reference point real space.

The luminance difference calculation unit 34 sets a first perpendicular imaginary line La (hereinbelow referred to as attention line La) that corresponds to a line segment extending in the perpendicular direction in real space and that passes through the detection area A1, as illustrated in part (a) of FIG. 16. The luminance difference calculation unit 35 sets a second perpendicular imaginary line Lr (hereinbelow referred to as reference line Lr) that is different from the attention line La, corresponds to the line segment extending in the perpendicular direction in real space, and passes through the detection area A1. Here, the reference line Lr is set to a position at a distance from the attention line La by a predetermined distance in real space. The lines that correspond to the line segments extending in the perpendicular direction in real space are lines that spread out in the radial direction from the position Ps of the camera 10 in a bird's-eye view image. These lines spreading out in the radial direction are lines that follow the collapsing direction of the three-dimensional object when converted to a bird's-eye view.

The luminance difference calculation unit 34 sets an attention point Pa on the attention line La (a point on the first perpendicular imaginary line). The luminance difference calculation unit 34 sets a reference point Pr on the reference line Lr (a point on the second perpendicular imaginary line). The attention line La, the attention point Pa, the reference line Lr, and the reference point Pr have the relationship in real space illustrated in part (b) of FIG. 16. It is apparent from part (b) of FIG. 16 that the attention line La and the reference line Lr are lines extending in the perpendicular direction in real space, and that the attention point Pa and the reference point Pr are points set to substantially the same height in real space. The attention point Pa and the reference point Pr are not necessarily required to be rigorously kept at the same height, and a certain amount of error that allows for the attention point Pa and the reference point Pr to be deemed to be at the same height is allowed.

The luminance difference calculation unit 34 determines the luminance difference between the attention point Pa and the reference point Pr. If the luminance difference between the attention point Pa and the reference point Pr is great, it is possible that an edge is present between the attention point Pa and the reference point Pr. In the second embodiment in particular, a perpendicular imaginary line is set as a line segment extending in the perpendicular direction in real space in relation to the bird's-eye view image, in order to detect a three-dimensional object present in the detection areas A1, A2. Therefore, there is a high possibility that there is an edge of a three-dimensional object in the location where the attention line La has been set when the luminance difference between the attention line La and the reference line Lr is high. Accordingly, the edge line detection unit 35 illustrated in FIG. 14 detects an edge line based on the luminance difference between the attention point Pa and the reference point Pr.

Figure 17:
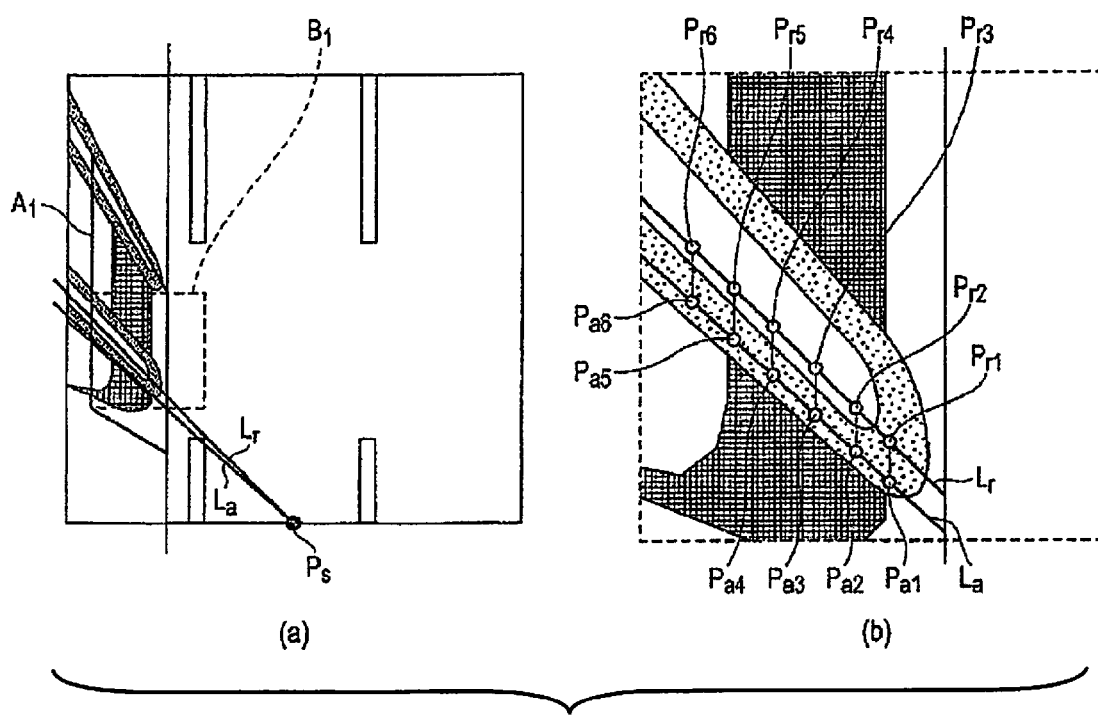
FIG. 17 is a view for describing the detailed operation of the luminance difference calculation unit according to the second embodiment, with part (a) illustrating the detection area in the bird's-eye view image, and part (b) illustrating the positional relationship between the attention line, reference line, attention point, and reference point in the bird's-eye view image.

This point will be described in greater detail. FIG. 17 is a view for describing the detailed operation of the luminance difference calculation unit 35. Part (a) of FIG. 17 illustrates a bird's-eye view image of the bird's-eye view state, and part (b) of FIG. 17 is an enlarged view of the bird's-eye view image illustrated in part (a) of FIG. 17. In FIG. 17, only the detection area A1 is illustrated and described, but the luminance difference is calculated using the same procedure for detection area A2.

When the adjacent vehicle V2 is being displayed in the captured image captured by the camera 10, the adjacent vehicle V2 appears in the detection area A1 in the bird's-eye view image, as illustrated in part (a) of FIG. 17. The attention line La is set on a rubber portion of a tire of the adjacent vehicle V2 in the bird's-eye view image in part (b) of FIG. 17, as illustrated in the enlarged view of area B1 in part (a) of FIG. 17. In this state, first, the luminance difference calculation unit 35 sets the reference line Lr. The reference line Lr is set along the perpendicular direction in a position set at a predetermined distance in real space from the attention line La. Specifically, in the three-dimensional object detection device 1a according to the present embodiment, the reference line Lr is set in a position at a distance of 10 cm away in real space from the attention line La. The reference line Lr is thereby set on the wheel of the tire of the adjacent vehicle V2 set, e.g., at a distance that corresponds to 10 cm from the rubber of the tire of the adjacent vehicle V2 in the bird's-eye view image.

Next, the luminance difference calculation unit 34 sets a plurality of attention points Pa1 to PaN on the attention line La. In part (b) of FIG. 17, six attention points Pa1 to Pa6 (hereinbelow referred to as attention point Pai when indicating an arbitrary point) are set for convenience of description. An arbitrary number of attention points Pa may be set on the attention line La. In the description below, N attention points Pa are set on the attention line La.

The luminance difference calculation unit 34 subsequently sets the reference points Pr1 to PrN so as to have the same height as the attention points Pa1 to PaN in real space. The luminance difference calculation unit 34 calculates the luminance difference between attention point Pa and reference point Pr pairs at the same height. The luminance difference calculation unit 34 thereby calculates the luminance difference between two pixels for each of the plurality of positions (1-N) along the perpendicular imaginary line extending in the perpendicular direction in real space. The luminance difference calculation unit 34 calculates the luminance difference between, e.g., a first attention point Pa1 and a first reference point Pr1, and calculates the luminance difference between a second attention point Pa2 and a second reference point Pr2. The luminance difference calculation unit 34 thereby determines the luminance difference in continuous fashion along the attention line La and the reference line Lr. In other words, the luminance difference calculation unit 34 sequentially determines the luminance difference between the third to $N^{th}$ attention points Pa3 to PaN and the third to $N^{th}$ reference points Pr3 to PrN.

The luminance difference calculation unit 34 repeats the process of setting the above-described reference line Lr, setting the attention point Pa, setting the reference point Pr, and calculating the luminance difference while shifting the attention line La within the detection area A1. In other words, the luminance difference calculation unit 34 repeatedly executes the above-described process while changing the positions of the attention line La and the reference line Lr by the same distance in real space along the direction in which the ground line L1 extends. The luminance difference calculation unit 34, e.g., sets the line that was the reference line Lr in the previous process to be the attention line La, sets the reference line Lr in relation to the attention line La, and sequentially determines the luminance difference.

In this manner, in the second embodiment, determining the luminance difference from the attention point Pa on the attention line La and the reference point Pr on the reference line Lr, which are at substantially the same height in real space, allows the luminance difference to be distinctly detected when an edge extending in the perpendicular direction is present. The precision for detecting a three-dimensional object can be enhanced without the process for detecting the three-dimensional object being affected, even when the three-dimensional object is enlarged in accordance with the height from the road surface by conversion to a bird's-eye view image in order compare the luminance between the perpendicular imaginary lines extending in the perpendicular direction in real space.

Returning to FIG. 14, the edge line detection unit 35 detects the edge line from the continuous luminance difference calculated by the luminance difference calculation unit 34. For example, in the case illustrated in part (b) of FIG. 17, the first attention point Pa1 and the first reference point Pr1 are positioned at the same tire portion, and the luminance difference is therefore small. On the other hand, the second to sixth attention points Pa2 to Pa6 are positioned at the rubber portions of the tire, and the second to sixth reference points Pr2 to Pr6 are positioned at the wheel portion of the tire. Therefore, the luminance difference between the second to sixth attention points Pa2 to Pa6 and the second to sixth reference points Pr2 to Pr6 is great. Accordingly, the edge line detection unit 35 is capable of detecting that an edge is present between the second to sixth attention points Pa2 to Pa6 and the second to sixth reference points Pr2 to Pr6 where the luminance difference is high.

Specifically, when an edge line is to be detected, the edge line detection unit 35 first assigns an attribute to the $i^{th}$ attention point Pai from the luminance difference between the $i^{th}$ attention point Pai (coordinates (xi, yi)) and the $i^{th}$ reference point Pri (coordinates (xi', yi')) in accordance with formula 1 noted below.

$$s(xi, yi)=1$$

when $I(xi, yi) > I(xi', yi') + t$ $$s(xi, yi)=-1$$

when $I(xi, yi) < I(xi', yi') - t$ $$s(xi, yi)=0 \qquad \text{Formula 1}$$

when the above do not hold true.

In formula 1 above, t represents a predetermined threshold value, I(xi, yi) represents the luminance value of the $i^{th}$ attention point Pai, and I(xi', yi') represents the luminance value of the $i^{th}$ reference point Pri. In accordance with formula 1, the attribute s(xi, yi) of the attention point Pai is '1' when the luminance value of the attention point Pai is greater than the luminance value obtained by adding the threshold value t to the reference point Pri. On the other hand, the attribute s(xi, yi) of the attention point Pai is '−1' when the luminance value of the attention point Pai is less than the luminance value obtained by subtracting the threshold value t from the reference point Pri. The attribute s(xi, yi) of the attention point Pai is '0' when the luminance value of the attention point Pai and the luminance value of the reference point Pri are in a relationship other than that stated above.

Next, the edge line detection unit 35 assesses whether the attention line La is an edge line from the continuity c(xi, yi) of the attribute s along the attention line La based on the following formula 2.

$$c(xi, yi)=1$$

when $s(xi, yi) = s(xi+1, yi+1)$ (excluding when 0=0)

$$c(xi, yi)=0 \qquad \text{Formula 2}$$

when the above does not hold true.

The continuity c(xi, yi) is '1' when the attribute s(xi, yi) of the attention point Pai and the attribute s(xi+1, yi+1) of the adjacent attention point Pai+1 are the same. The continuity c(xi, yi) is '0' when the attribute s(xi, yi) of the attention point Pai and the attribute s(xi+1, yi+1) of the adjacent attention point Pai+1 are not the same.

Next, the edge line detection unit 35 determines the sum of the continuities c of all the attention points Pa on the attention line La. The edge line detection unit 35 divides the sum of the continuities c thus determined by the number N of attention points Pa to thereby normalize the continuity c. The edge line detection unit 35 determines the attention line La to be an edge line when the normalized value has exceeded a threshold value θ. The threshold value θ is set in advance by experimentation or other means.

In other words, the edge line detection unit 35 determines whether the attention line La is an edge line based on formula 3 noted below. The edge line detection unit 35 then determines whether all of the attention lines La drawn on the detection area A1 are edge lines.

$$\Sigma c(xi, yi)/N > \theta \qquad \text{Formula 3}$$

Figure 18:
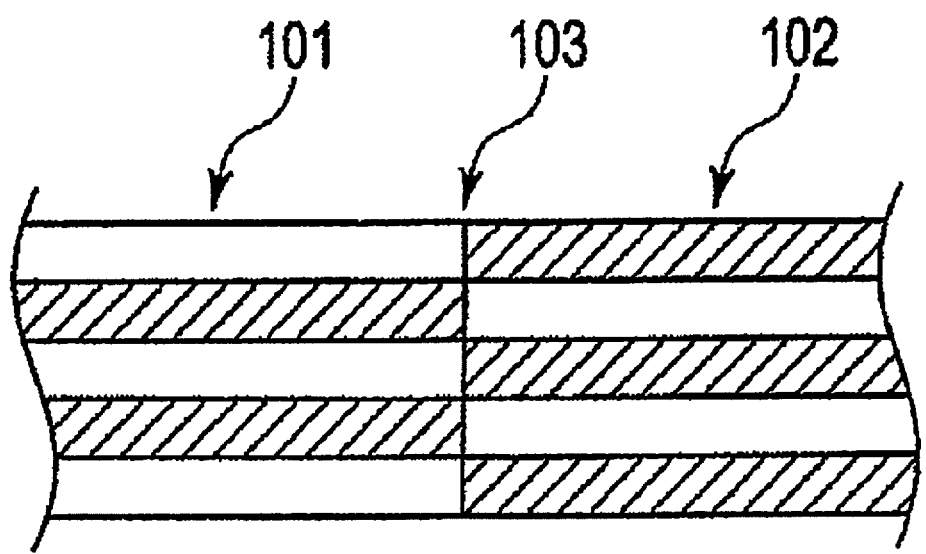
FIG. 18 is a view illustrating an image example for describing edge detection operation.

In this manner, in the second embodiment, an attribute is assigned to the attention point Pa based on the luminance difference between the attention point Pa on the attention line La and the reference point Pr on the reference line Lr, and it is determined whether the attention line La is an edge line based on the continuity c of the attributes along the attention line La. Therefore, the boundaries between areas having high luminance and areas having low luminance are detected as edge lines, and edges can be detected in accordance with the natural senses of a human. The results of the above will be described. FIG. 18 is a view illustrating an image example for describing the processing of the edge line detection unit 36. This image example is an image in which a first stripe pattern 101 and a second stripe pattern 102 are adjacent to each other, the first stripe pattern 101 indicating a stripe pattern in which areas of high luminance and areas of low luminance are repeated, and the second stripe pattern 102 indicating a stripe pattern in which areas of low luminance and areas of high luminance are repeated. Also, in this image example, areas of the first stripe pattern 101 in which the luminance is high, and areas of the second stripe pattern 102 in which the luminance is low are adjacent to each other, and areas of the first stripe pattern 101 in which the luminance is low, and areas of the second stripe pattern 102 in which the luminance is high are adjacent to each other. The location 103 positioned on the boundary between the first stripe pattern 101 and the second stripe pattern 102 tends not to be perceived as an edge by human senses.

In contrast, because the areas of low luminance and the areas of high luminance are adjacent to each other, the location 103 is recognized as an edge when an edge is detected only by luminance difference. However, the edge line detection unit 35 assesses the location 103 to be an edge line only when there is continuity in the attributes of the luminance difference. Therefore, the edge line detection unit 35 is capable of suppressing errant assessment in which the location 103, which is not recognized as an edge line by human senses, is recognized as an edge line, and edges can be detected in accordance with human senses.

Returning to FIG. 14, the three-dimensional object detection unit 33a detects a three-dimensional object based on the quantity of edge lines detected by the edge line detection unit 35. As described above, the three-dimensional object detection device 1a according to the present embodiment detects an edge line extending in the perpendicular direction in real space. Detecting many edge lines extending in the perpendicular direction indicates that there is a high possibility that a three-dimensional object is present in the detection areas A1, A2. Accordingly, the three-dimensional object detection unit 33a detects a three-dimensional object based on the quantity of edge lines detected by the edge line detection unit 35. Specifically, the three-dimensional object detection unit 33a determines whether the quantity of edge lines detected by the edge line detection unit 35 is a predetermined threshold value β or greater, and when the quantity of edge lines is a predetermined threshold value β or greater, the edge lines detected by the edge line detection unit 35 are determined to be the edge lines of a three-dimensional object.

Furthermore, prior to detecting the three-dimensional object, the three-dimensional object detection unit 33a assesses whether the edge lines detected by the edge line detection unit 35 are correct. The three-dimensional object detection unit 33a assesses whether a change in luminance on the edge lines is a predetermined threshold value tb or greater along the edge lines of the bird's-eye view image. When the change in luminance on the edge lines in the bird's-eye view image is a predetermined threshold value tb or greater, the edge lines are determined to have been detected by errant assessment. On the other hand, when the change in luminance on the edge lines in the bird's-eye view image is less than a predetermined threshold value tb, it is assessed that the edge lines are correct. The threshold value tb is set in advance by experimentation or other means.

Figure 19:
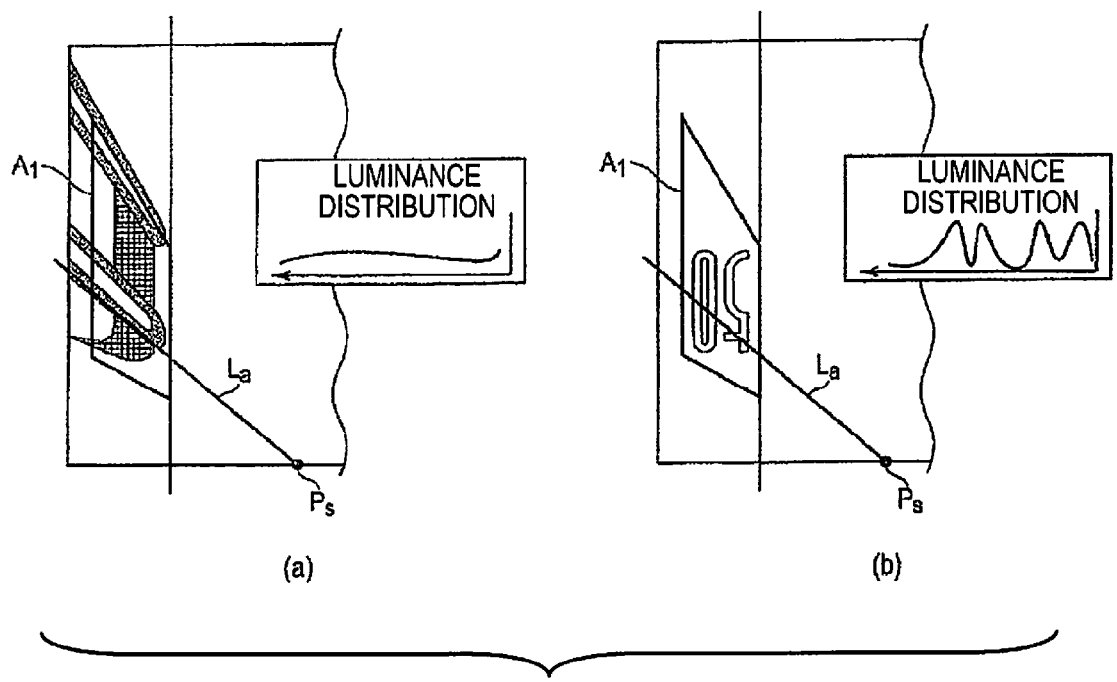
FIG. 19 is a view illustrating the edge line and the luminance distribution on the edge line, with part (a) illustrating the luminance distribution when a three-dimensional object (adjacent vehicle) is present in the detection area, and part (b) illustrating the luminance distribution when a three-dimensional object is not present in the detection area.

FIG. 19 is a view illustrating the luminance distribution on the edge line, part (a) of FIG. 19 illustrates the edge line and the luminance distribution when an adjacent vehicle V2 as a three-dimensional object is present in the detection area A1, and part (b) of FIG. 19 illustrates the edge line and the luminance distribution when a three-dimensional object is not present in the detection area A1.

As illustrated in part (a) of FIG. 19, it is assumed that it has been determined that the attention line La set on the tire rubber portion of the adjacent vehicle V2 in on an edge line in the bird's-eye view image. In this case, the change in luminance on the attention line La in the bird's-eye view image is gradual. This is due to the image captured by the camera 10 being converted in viewpoint to a bird's-eye view image, whereby the tire of the adjacent vehicle is enlarged within the bird's-eye view image. On the other hand, the attention line La set in the white character portion "50" drawn on the road surface in the bird's-eye view image is assumed to have been errantly assessed to be an edge line, as illustrated in part (b) of FIG. 19. In this case, the change in luminance on the attention line La in the bird's-eye view image has considerable undulations. This is because the road and other portions of low luminance are mixed with the portions of high luminance in the white characters on the edge line.

The three-dimensional object detection unit 33a assesses whether an edge line has been detected by errant assessment based on differences in the luminance distribution on the attention line La as described above. For example, a three-dimensional object included in a captured image tends to appear in an enlarged state in a bird's-eye view image when the captured image acquired by the camera 10 is converted to a bird's-eye view image. As described above, when the tire of an adjacent vehicle is enlarged, changes in the luminance of the bird's-eye view image in the enlarged direction tend to be small because the tire as a single location is enlarged. In contrast, when a character or the like drawn on the road surface has been errantly assessed to be an edge line, areas such as the character portion having high luminance and areas such as the road surface portion having low luminance are included in the bird's-eye view image in an intermixed fashion. In such a case, changes in luminance in the enlarged direction tend to be greater. Accordingly, the three-dimensional object detection unit 33a determines that the edge line has been detected by errant assessment when the change in luminance along the edge line is at a predetermined threshold value tb or greater, and determines that the edge line is not caused by a three-dimensional object. A reduction in precision for detecting a three-dimensional object is thereby suppressed when white characters such as "50" on the road surface, roadside vegetation, and the like are assessed to be edge lines. On the other hand, the three-dimensional object detection unit 33a determines that an edge line is the edge line of a three-dimensional object and determines that a three-dimensional object is present when changes in luminance along the edge line are less than a predetermined threshold value tb.

Specifically, the three-dimensional object detection unit 33a calculates the change in luminance of the edge line using formula 4 or 5 noted below. The change in luminance of the edge line corresponds to the evaluation value in real space in the perpendicular direction. Formula 4 evaluates the luminance distribution using the total value of the square of the difference between the luminance value I(xi, yi) and the adjacent $i^{th}+1$ luminance value I(xi+1, yi+1) on the attention line La. Formula 5 evaluates the luminance distribution using the total value of the absolute value of the difference between the $i^{th}$ luminance value I(xi, yi) and the adjacent $i^{th}+1$ luminance value I(xi+1, yi+1) on the attention line La.

Evaluation value in perpendicular equivalent
direction=$\Sigma[\{I(xi, yi)-I(xi+1, yi+1)\}^2]$    Formula 4

Evaluation value in perpendicular equivalent
direction=$\Sigma|I(xi, yi)-I(xi+1, yi+1)|$    Formula 5

No limitation is imposed in the use of formula 5, and it is also possible to binarize an attribute b of an adjacent luminance value using a threshold value t2, and then sum the binarized attribute b for all of the attention points Pa, as in formula 6 noted below.

Evaluation value in perpendicular equivalent
direction=$\Sigma b(xi, yi)$ where $b(xi, yi)=1$ when $|I(xi, yi)-I(xi+1, yi+1)|>t2$ and $b(xi, yi)=0$    Formula 6 when the above does not hold true.

The attribute b(xi, yi) of the attention point Pa(xi, yi) is '1' when the absolute value of the luminance difference between the luminance value of the attention point Pai and the luminance value of the reference point Pri is greater than a threshold value t2. When the above relationship does not hold true, the attribute b(xi, yi) of the attention point Pai is '0.' The threshold value t2 is set in advance by experimentation or other means so that the attention line La is not assessed to be on the same three-dimensional object. The three-dimensional object detection unit 33a then sums the attribute b for all of the attention points Pa on the attention line La and determines the evaluation value in the perpendicular equivalent direction to thereby assess whether an edge line is caused by a three-dimensional object and that a three-dimensional object is present.

The three-dimensional object assessment unit 34a illustrated in FIG. 14 similarly assesses, based on the amount of variability in the image information, whether the three-dimensional object detected by the three-dimensional object detection unit 33 is another vehicle (adjacent vehicle) traveling in an adjacent lane. Specifically, in the second embodiment, the three-dimensional object assessment unit 34a calculates the relative movement speed of the three-dimensional object in relation to the host vehicle based on the edge information (edge components and other information) in the bird's-eye view image, determines the amount of variability in the image information based on amount of change in time of the relative movement speed of the three-dimensional object, and assesses whether the detected three-dimensional object is a non-detection object or an adjacent vehicle. For example, the three-dimensional object assessment unit 34a determines that the amount of variability in the image information higher in commensurate fashion to a larger absolute value of the amount of change in time of the relative movement speed of the three-dimensional object, and determines the possibility to be high that the detected three-dimensional object is a non-detection object. The method for assessment carried out by the three-dimensional object assessment unit 34a is later described in detail.

Figure 20:
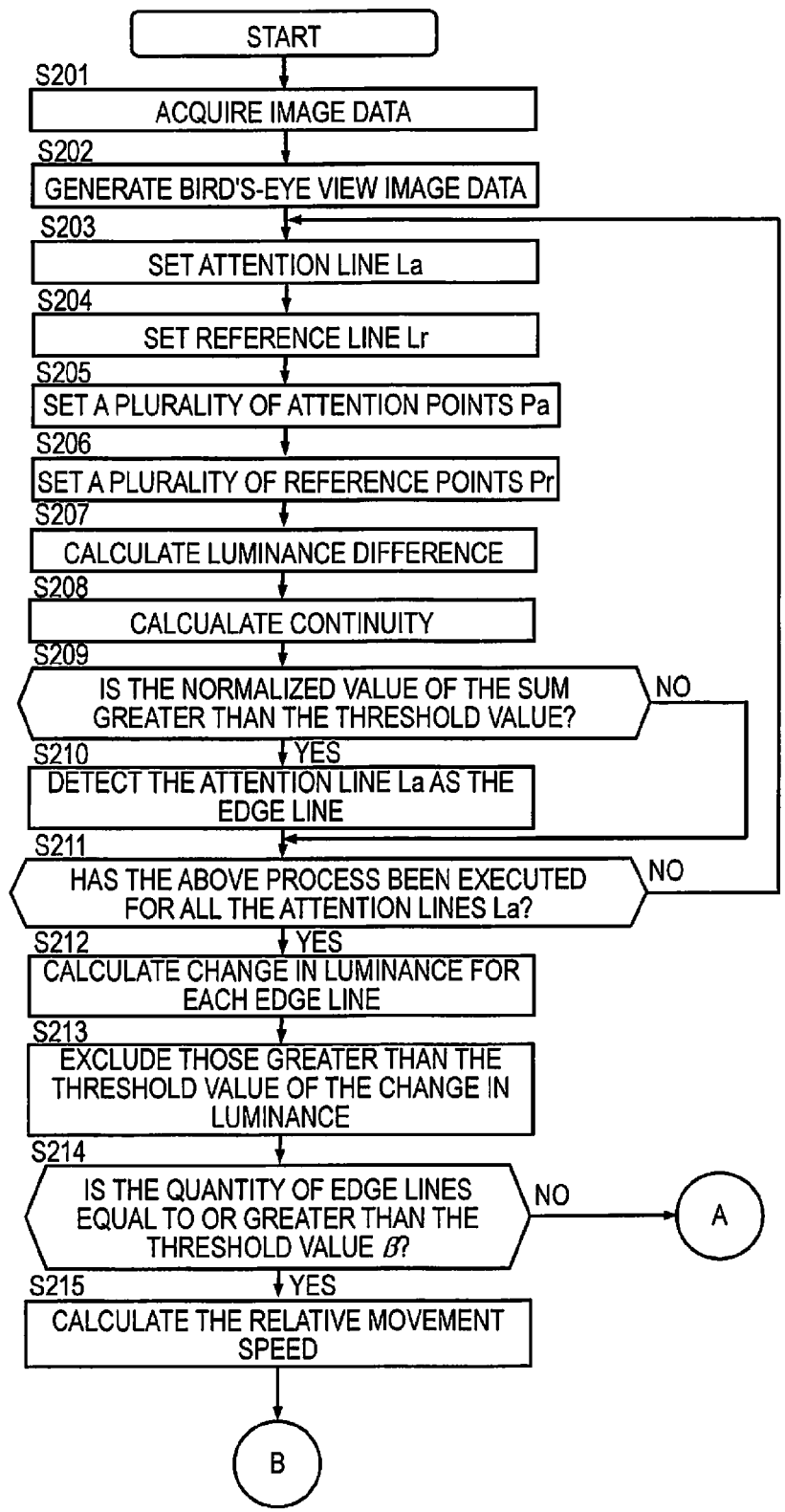
FIG. 20 is a first part of a flowchart illustrating the method for detecting an adjacent vehicle according to the second embodiment.

Next, the method for detecting an adjacent vehicle according to the second embodiment will be described. FIG. 20 is a flowchart illustrating the details of the method for detecting an adjacent vehicle according to the second embodiment. In FIG. 20, the process involved with detection area A1 will be described for the sake of convenience, but the same process is executed for the detection area A2 as well.

First, in step S201, a predetermined area specified by the view angle a and the attachment position is captured by the camera 10, and the image data of the captured image P captured by the camera 10 is acquired by the computer 30a. Next, the viewpoint conversion unit 31 converts the viewpoint of the acquired image data and generates bird's-eye view image data in step S202.

Next, in step S203, the luminance difference calculation unit 34 sets the attention line La on the detection area A1. At this time, the luminance difference calculation unit 34 sets a line corresponding to a line extending in the perpendicular direction in real space as the attention line La. Also, in step S204, the luminance difference calculation unit 34 also sets the reference line Lr on the detection area A1. The luminance difference calculation unit 34 sets, as the reference line Lr, a line that corresponds to a line extending in the perpendicular direction in real space, the line also being separated by a predetermined distance in real space from the attention line La.

Next, in step S205, the luminance difference calculation unit 34 sets a plurality of attention points on the attention line La. In doing so, the luminance difference calculation unit 34 sets a certain number of attention points Pa that will not be problematic during edge detection by the edge line detection unit 35. Also, in step S206, the luminance difference calculation unit 34 sets reference points Pr so that the attention points Pa and the reference points Pr are at substantially the same height in real space. The attention points Pa and the reference points Pr thereby line up in substantially the horizontal direction, and the edge line extending in the perpendicular direction in real space is more readily detected.

Next, in step S207, the luminance difference calculation unit 34 calculates the luminance difference between the attention points Pa and the reference points Pr at the same height in real space. The edge line detection unit 35 calculates the attribute s of the attention points Pa in accordance with formula 1 described above. In step S208, the edge line detection unit 35 then calculates the continuity c of the attribute s of the attention points Pa in accordance with formula 2. In step S209, the edge line detection unit 35 furthermore assesses whether a value obtained by normalizing the sum of the continuity c is greater than a threshold value θ in accordance with formula 3. When it has been determined that the normalized value is greater than the threshold value θ (step S209=Yes), the edge line detection unit 35 detects the attention line La as the edge line in step S210. The process then proceeds to step S211. When it has been determined that the normalized value is not greater than the threshold value θ (step S209=No), the edge line detection unit 35 does not detect that the attention line La is an edge line, and the process proceeds to step S211.

In step S211, the computer 30a determines whether the processes of steps S203 to S210 have been executed for all the attention lines La that can be set on the detection area A1.

When it has been determined that the above processes have not been carried out for all the attention lines La (step S211=No), the process returns to step S203, sets a new attention line La, and repeats the process through step S211. On the other hand, when it has been determined that the processes have been carried out for all the attention lines La (step S211=Yes), the process proceeds to step S212.

In step S212, the three-dimensional object detection unit 33a calculates the change in luminance along the edge line for each edge line detected in step S210. The three-dimensional object detection unit 33a calculates the change in luminance of edge lines in accordance with any of formulas 4, 5, and 6. Next, in step S213, the three-dimensional object detection unit 33a excludes, from among the edge lines, edge lines in which the change in luminance is at a predetermined threshold value tb or greater. In other words, when an edge line having a large change in luminance is not assessed to be a correct edge line, the edge line is not used for detecting a three-dimensional object. As described above, this is done in order to suppress the detection of characters on the road surface, roadside vegetation, and the like included in the detection area A1 as edge lines. Therefore, the predetermined threshold value tb is determined by experimentation or other means in advance, and is set based on the change in luminance that occurs due to characters on the road surface, roadside vegetation, and the like. On the other hand, the three-dimensional object detection unit 33a determines an edge line having a change in luminance that is less than a predetermined threshold value tb to be an edge line of a three-dimensional object, and thereby detects the three-dimensional object present in an adjacent vehicle.

Figure 21:
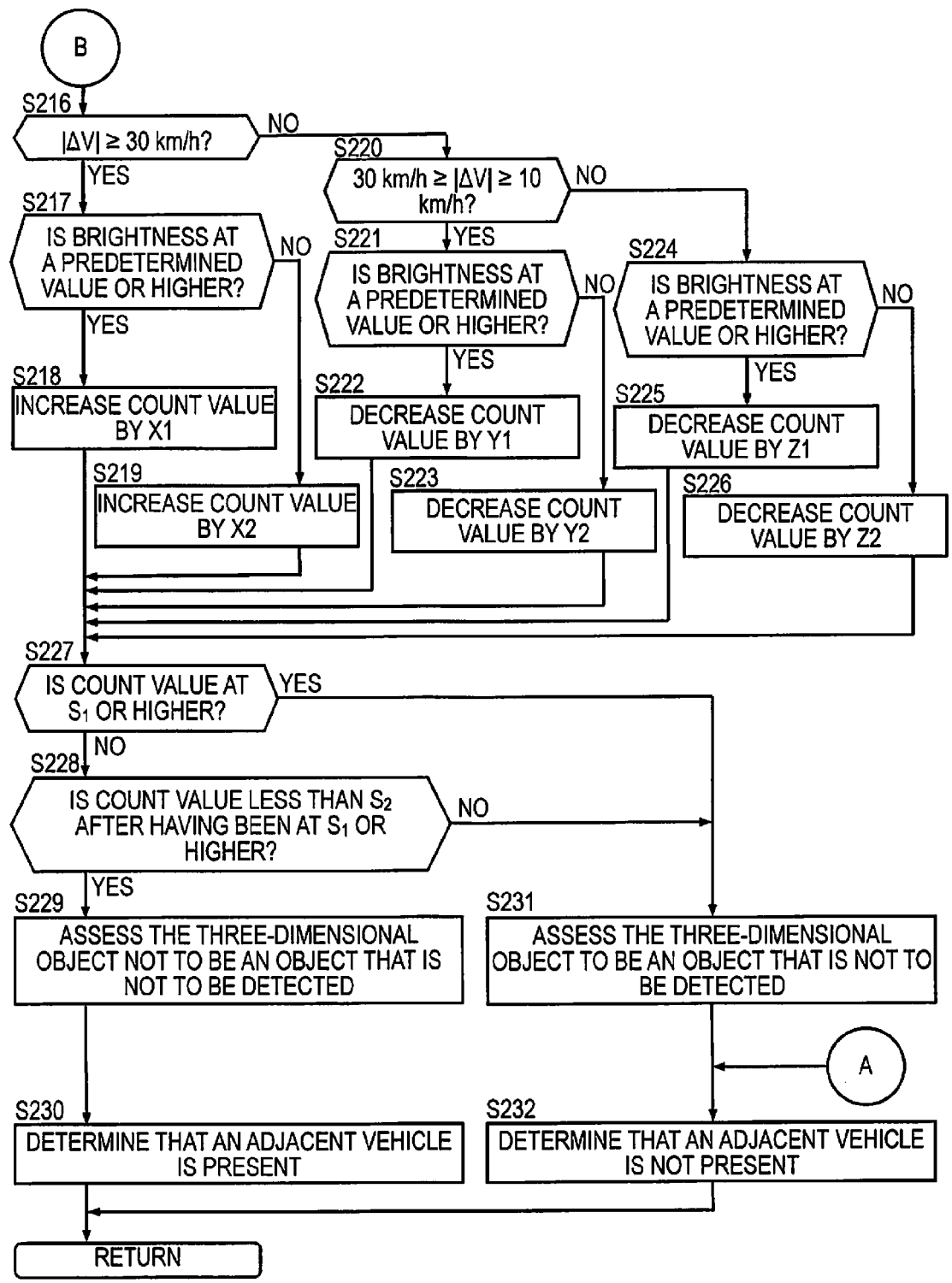
FIG. 21 is a second part of a flowchart illustrating the method for detecting an adjacent vehicle according to the second embodiment.

Next, in step S214, it is determined by the three-dimensional object detection unit 33a whether the quantity of edge lines is a predetermined threshold value $\beta$ or higher. As used herein, the threshold value $\beta$ is a value obtained and set by experimentation in advance, and when, e.g., a four-wheeled vehicle has been set as the three-dimensional object to be detected, the threshold value $\beta$ is set by experimentation in advance based on the number of edge lines of a four-wheeled vehicle that has appeared in the detection area A1. When it has been assessed that the quantity of edge lines is at the threshold value $\beta$ or greater (step S214=Yes), the three-dimensional object detection unit 33a determines that a three-dimensional object is present in the detection area A1, and the process proceeds to step S215. On the other hand, when it is has been assessed that the quantity of edge lines is not at a threshold value $\beta$ or higher (step S214=No), the three-dimensional object detection unit 33a determines that a three-dimensional object is not present in the detection area A1, the process proceeds to step S232 in FIG. 21, and the three-dimensional object assessment unit 34a assesses that an adjacent vehicle is not present in the detection area A1.

In step S215, the relative movement speed of the three-dimensional object in relation to the host vehicle is calculated by the three-dimensional object assessment unit 34a. For example, the three-dimensional object assessment unit 34a counts the number of pixels in which a predetermined edge component has been detected, along the direction in which the three-dimensional object collapses during viewpoint conversion to form a frequency distribution from the bird's-eye view image $PB_t$, whereby a one-dimensional edge waveform is generated, and the relative movement speed of the three-dimensional object can be calculated from the difference in the edge waveform at a single moment prior and the edge waveform at the current moment. The process then proceeds to step S216 in FIG. 21.

In steps S216 to S232, the same processing is carried out as in steps S113 to S126 and steps S128 to S130 in the first embodiment. In other words, the three-dimensional object assessment unit 34a detects the amount of change in time of the relative movement speed of the three-dimensional object based on the relative movement speed of the three-dimensional object calculated in step S215, and determines whether the three-dimensional object is a non-detection object in accordance with the amount of change in time of the relative movement speed.

Specifically, when the absolute value $|\Delta V|$ of the amount of change in time of the relative movement speed of the three-dimensional object is at 30 km/h or higher ($|\Delta V| \geq 30$ km/h (step S216=Yes)) and when the brightness of the detection area A1 is at a predetermined value or greater (step S217=Yes), the three-dimensional object assessment unit 34a increases the count value by X1 (step S218), and, when the brightness of the detection area A1 is less than a predetermined value (step S217=No), increases the count value by X2 (step S219).

When the absolute value $|\Delta V|$ of the amount of change in time of the relative movement speed of the three-dimensional object is less than 30 km/h and 10 km/h or greater (30 km/h>$|\Delta V| \geq 10$ km/h (step S220=Yes)), the three-dimensional object assessment unit 34a decreases the count value by Y1 (step S222) when the brightness of the detection area A1 is at a predetermined value or greater (step S221=Yes), and decreases the count value by Y2 (step S223) when the brightness of the detection area A1 is less than a predetermined value (step S221=No).

When the absolute value $|\Delta V|$ of the amount of change in time of the relative movement speed of the three-dimensional object is less than 10 km/h (10 km/h>$|\Delta V|$ (step S220=No)), the three-dimensional object assessment unit 34a decreases the count value by Z1 (step S225) when the brightness of the detection area A1 is at a predetermined value or greater (step S224=Yes), and decreases the count value by Z2 (step S226) when the brightness of the detection area A1 is less than a predetermined value (step S224=No).

The three-dimensional object assessment unit 34a determines whether the count value is at the first threshold value $s_1$ or greater illustrated in FIG. 10 (step S227), assesses that a detected three-dimensional object is a non-detection object when the count value is at the first threshold value $s_1$ or greater (step S231), and assesses that an adjacent vehicle is not present in the adjacent lane (step S232).

After the count value has become less than the first threshold value $s_1$ and is equal to or greater than the second threshold value $s_2$ (step S227=No, step S228=No), the three-dimensional object assessment unit 34a assesses the three-dimensional object to be a non-detection object (step S231), and determines that an adjacent vehicle is not present in the adjacent lane (step S232). On the other hand, when the count value has become less than the first threshold value $s_1$ and thereafter has become equal to or greater than the second threshold value $s_2$ (step S227=No, step S228=Yes), it is assessed that the three-dimensional object not to a non-detection object (step S229) and it is determined that an adjacent vehicle is present in the adjacent lane (step S230). The process then returns to step S201 in FIG. 20 and the above-described processing is repeated.

In this manner, in the second embodiment, a captured image is converted to a bird's-eye view image, and edge information of the three-dimensional object is detected from the converted bird's-eye view image. The relative movement speed of the three-dimensional object is detected from the edge components detected in the bird's-eye view image, and it is assessed whether the detected three-dimensional object is a plant, snow, a guardrail, or another non-detection object based on the absolute value $|\Delta V|$ of the amount of change of the relative movement speed of the three-dimensional object. In addition to the effects of the first embodiment, in the second embodiment, it is thereby possible to suitably assess whether a detected three-dimensional object is a non-detection object based on the edge information even when an adjacent vehicle is detected based on edge information. As a result, it is possible to effectively prevent a non-detection object from being errantly detected as an adjacent vehicle.

The embodiments described above are described in order to facilitate understanding of the present invention, and are not described in order to limit the present invention. Therefore, the elements disclosed in the embodiments above are intended to include all design modifications and equivalents thereto that lie within the technical range of the present invention.

For example, in the embodiments described above, a configuration was given as an example in which a non-detection object is detected based on the variability $|\Delta V|$ in the amount of change of the relative movement speed of the three-dimensional object in relation to the host vehicle, but no limitation is imposed thereby, and, for example, it is also possible to use a configuration in which a non-detection object is detected by analyzing the captured image captured by the camera 10 using two-dimensional texture analysis and detecting variability in the captured image based on the analysis results. For example, it is possible to assess that a three-dimensional object captured in the captured image is a non-detection object when pixels having a predetermined difference in concentration are detected in a predetermined ratio or greater as a result of a two-dimensional texture analysis of the captured image. Alternatively, it is also possible to use a configuration in which the captured image is analyzed by fast Fourier transform, and when high-frequency components having a predetermined value or greater are detected in a predetermined ratio or greater as a result of the analysis, a three-dimensional object captured in the captured image is assessed to be a non-detection object.

A configuration was given as an example in the embodiments described above in which a detected three-dimensional object is assessed not to be an adjacent vehicle when the detected three-dimensional object has been assessed to be a non-detection object, but no limitation is imposed thereby, and it is also possible to use a configuration in which it is not assessed whether a detected three-dimensional object is an adjacent vehicle when the detected three-dimensional object has been assessed to be a non-detection object.

Additionally, a configuration was given as an example in the embodiments described above in which the pixel values of the difference image $PD_1$ are detected as "0" and "1" by the alignment unit 32 and the pixels having a pixel value of "1" in the difference image $PD_t$ are counted as difference pixels DP by the three-dimensional object detection unit 33 based on the difference image $PD_t$ to thereby detect a three-dimensional object, but no limitation is imposed by this configuration, and it is also possible use a configuration in which the alignment unit 32, e.g., detects the pixel values of the difference image $PD_t$ using the absolute value of the pixel values of the bird's-eye view images $PB_t$, $PB_{t-1}$, and the three-dimensional object detection unit 33 counts the pixels that exceed a predetermined difference threshold value as the difference pixels DP.

Furthermore, in the embodiments described above, a captured image of the current moment and an image at a single moment prior are converted to bird's-eye views, the converted bird's-eye views are aligned, a difference image $PD_t$ is then generated, and the generated difference image $PD_t$ is evaluated along the collapsing direction (the direction in which the three-dimensional object collapses when a captured image is converted to a bird's-eye view) to generate a difference waveform $DW_t$, but no limitation is imposed thereby. For example, it is also possible to use a configuration in which only the image at a single moment prior is converted to a bird's-eye view, the converted bird's-eye view is aligned, then converted again to a captured image equivalent, a difference image is generated using this image and the image at the current moment, and the generated difference image is evaluated along the direction corresponding to the collapsing direction (i.e., the direction obtained by converting the collapsing direction to a direction in the captured image) to thereby generate the difference waveform $DW_t$. In other words, a bird's-eye view is not expressly required to be generated as a necessity as long as the image at the current moment and the image at a single moment prior are aligned, a difference image $PD_t$ is generated from the difference between the two aligned images, and the difference image $PD_t$ can be evaluated along the collapsing direction of a three-dimensional object when the difference image $PD_t$ is converted to a bird's-eye view.

Additionally, in the embodiments described above, the speed of the host vehicle V1 is determined based on a signal from the speed sensor 20, but no limitation is imposed thereby, and it is also possible to use a configuration in which the speed is estimated from a plurality of images at different moments. In this case, the speed sensor 20 is not required and the configuration can be simplified.

The camera 10 in the embodiments described above corresponds to the image capturing means of the present invention. The viewpoint conversion unit 31 corresponds to the image conversion means of the present invention, and the alignment unit 32 and the three-dimensional object detection unit 33 correspond to the three-dimensional object detection means of the present invention. The three-dimensional object detection unit 33 corresponds to the movement speed calculation means of the present invention, and the three-dimensional object assessment unit 34 corresponds to the three-dimensional object assessment means, the non-detection object assessment means, and the control means of the present invention.

The invention claimed is:

1. A three-dimensional object detection device comprising:
an image capturing unit arranged to capture images of a predetermined detection area rearward of a host vehicle equipped with the three-dimensional object detection device;
an image conversion unit programmed to convert a viewpoint of the images obtained by the image capturing unit to create bird's-eye view images;
a three-dimensional object detection unit programmed to detect a presence of a three-dimensional object within the predetermined detection area in which the bird's-eye view images obtained at different times by the image conversion unit are aligned, and difference waveform information is generated by counting and creating a frequency distribution of a number of pixels that indicate a predetermined difference in a difference image of the bird's-eye view images that were aligned to detect the presence of the three-dimensional object within the predetermined detection area;
a movement speed calculation unit programmed to calculate a movement speed of the three-dimensional object based on the difference waveform information;

a three-dimensional object assessment unit programmed to assess whether the three-dimensional object detected by the three-dimensional object detection unit is another vehicle present in the predetermined detection area based on the difference waveform information;

a non-detection-object assessment unit programmed to repeatedly calculate an amount of change in time of the movement speed of the three-dimensional object to thereby detect an amount of variability in the movement speed of the three-dimensional object, and to determine that the three-dimensional object has a greater possibility of being a non-detection object that is different from the another vehicle as the amount of variability becomes higher; and a control unit programmed to inhibit the three-dimensional object assessment unit from assessing that the three-dimensional object is the another vehicle based on an assessment results of the non-detection-object assessment unit.

2. The three-dimensional object detection device according to claim 1, wherein the non-detection-object assessment unit increases a predetermined count value by an increase amount when the amount of variability is at a predetermined first assessment value or greater, and decreases the predetermined count value by an decrease amount when the amount of variability is at a second assessment value or less, which is less than the first assessment value, to thereby increase or decrease the predetermined count value based on the amount of variability and to assess whether the three-dimensional object is the non-detection object based on an increased/decreased count value of the predetermined count value that has been increased or decreased.

3. The three-dimensional object detection device according to claim 2, wherein the non-detection-object assessment unit assesses that the three-dimensional object is the non-detection object when the predetermined count value has become a predetermined first threshold value or greater as a result of the predetermined count value having been increased or decreased based on the amount of variability.

4. The three-dimensional object detection device according to claim 3, wherein the non-detection-object assessment unit assesses that the three-dimensional object is not the non-detection object when the predetermined count value has become less than a predetermined second threshold value, which is less than the first threshold value, after the predetermined count value having become the first threshold value or greater.

5. The three-dimensional object detection device according to claim 2, wherein the three-dimensional-object assessment unit further detects a brightness of the predetermined detection area, the non-detection-object assessment unit reduces the increase amount or the decrease amount based on the amount of variability when the brightness of the predetermined detection area is less than a predetermined value in comparison with when the brightness of the predetermined detection area is at the predetermined value or greater.

6. The three-dimensional object detection device according to claim 1, wherein the three-dimensional object detection unit counts a number of pixels that show a predetermined difference in the difference image along a direction in which the three-dimensional object collapses when a conversion in viewpoint to the bird's-eye view images is carried out, to form the frequency distribution and thereby generate one-dimensional difference waveform information.

7. A three-dimensional object detection device comprising:

an image capturing unit arranged to capture an image of a predetermined detection area rearward of a host vehicle equipped with the three-dimensional object detection device;

an image conversion unit programmed to convert a viewpoint of the image obtained by the image capturing unit to create a bird's-eye view image;

a three-dimensional object detection unit programmed to detect a presence of a three-dimensional object within the predetermined detection area based on edge information from the bird's-eye view image obtained from the image conversion unit;

a movement speed calculation unit programmed to calculate a movement speed of the three-dimensional object based on the edge information;

a three-dimensional object assessment unit programmed to assess whether the three-dimensional object detected by the three-dimensional object detection unit is another vehicle present in the predetermined detection area based on the edge information;

a non-detection-object assessment unit programmed to repeatedly calculate an amount of change in time of the movement speed of the three-dimensional object to thereby detect an amount of variability in the movement speed of the three-dimensional object, and to determine that the three-dimensional object has a greater possibility of being a non-detection object that is different from the another vehicle as the amount of variability becomes higher; and a control unit programmed to inhibit the three-dimensional object assessment unit from assessing that the three-dimensional object is the another vehicle based on an assessment results of the non-detection-object assessment unit.

8. The three-dimensional object detection device according to claim 7, wherein the three-dimensional object detection unit detects the edge information along a direction in which the three-dimensional object collapses when a conversion in viewpoint to the bird's-eye view image is carried out.

9. The three-dimensional object detection device according to claim 7, wherein the non-detection-object assessment unit increases a predetermined count value by an increase amount when the amount of variability is at a predetermined first assessment value or greater, and decreases the predetermined count value by an decrease amount when the amount of variability is at a second assessment value or less, which is less than the first assessment value, to thereby increase or decrease the predetermined count value based on the amount of variability and to assess whether the three-dimensional object is the non-detection object based on an increased/decreased count value of the predetermined count value that has been increased or decreased.

10. The three-dimensional object detection device according to claim 9, wherein the non-detection-object assessment unit assesses that the three-dimensional object is the non-detection object when the predetermined count value has become a predetermined first threshold value or greater as a result of the predetermined count value having been increased or decreased based on the amount of variability.

11. The three-dimensional object detection device according to claim 10, wherein
the non-detection-object assessment unit assesses that the three-dimensional object is not the non-detection object when the predetermined count value has become less than a predetermined second threshold value, which is less than the first threshold value, after the predetermined count value having become the first threshold value or greater.

12. The three-dimensional object detection device according to claim 11, wherein
the three-dimensional-object assessment unit further detects a brightness of the predetermined detection area,
the non-detection-object assessment unit reduces the increase amount or the decrease amount based on the amount of variability when the brightness of the predetermined detection area is less than a predetermined value in comparison with when the brightness of the predetermined detection area is at the predetermined value or greater.

13. The three-dimensional object detection device according to claim 10, wherein
the three-dimensional-object assessment unit further detects a brightness of the predetermined detection area,
the non-detection-object assessment unit reduces the increase amount or the decrease amount based on the amount of variability when the brightness of the predetermined detection area is less than a predetermined value in comparison with when the brightness of the predetermined detection area is at the predetermined value or greater.

14. The three-dimensional object detection device according to claim 9, wherein
the three-dimensional-object assessment unit further detects a brightness of the predetermined detection area,
the non-detection-object assessment unit reduces the increase amount or the decrease amount based on the amount of variability when the brightness of the predetermined detection area is less than a predetermined value in comparison with when the brightness of the predetermined detection area is at the predetermined value or greater.

15. A three-dimensional object detection device comprising:
an image capturing unit arranged to capture an image of a predetermined detection area rearward of a host vehicle equipped with the three-dimensional object detection device;
an image conversion unit programmed to convert a viewpoint of the image obtained by the image capturing unit to create a bird's-eye view image;
a three-dimensional object detection unit programmed to detect a presence of a three-dimensional object based on a distribution information of pixels having a luminance difference of a predetermined threshold value or greater in a direction in which the three-dimensional object collapses when a conversion in viewpoint to a bird's-eye view image is carried out on the bird's-eye view image obtained from the image conversion unit;
a movement speed calculation unit programmed to calculate a movement speed of the three-dimensional object based on an amount of change in time of the distribution information of pixels;
a three-dimensional object assessment unit programmed to assess whether the three-dimensional object detected by the three-dimensional object detection unit is another vehicle present in the predetermined detection area based on the distribution information of pixels;
a non-detection-object assessment unit programmed to repeatedly calculate an amount of change in time of the movement speed of the three-dimensional object to thereby detect an amount of variability in the movement speed of the three-dimensional object, and to determine that the three-dimensional object has a high possibility of being the another vehicle when the amount of variability is less than a predetermined value; and
a control unit programmed to facilitate assessment by the three-dimensional object assessment unit that the three-dimensional object is the another vehicle when the possibility that the three-dimensional object is the another vehicle has been assessed to be high by the non-detection-object assessment unit.

\* \* \* \* \*